United States Patent [19]

Sanders et al.

[11] Patent Number: 4,782,463
[45] Date of Patent: Nov. 1, 1988

[54] METHOD FOR GENERATING DISPLAY SCREENS FOR A SET OF APPLICATION PROGRAMS BY CALLING SCREEN MANAGEMENT SUBROUTINES

[75] Inventors: John R. Sanders; Bern E. Hofmann, both of Cobb County, Ga.

[73] Assignee: International Business Machines Corp., Armonk, N.Y.

[21] Appl. No.: 775,545

[22] Filed: Sep. 12, 1985

[51] Int. Cl.⁴ .................... G06F 3/14; G06F 15/00
[52] U.S. Cl. .................... 364/900; 364/300; 364/521
[58] Field of Search ... 364/200 MS File, 900 MS File, 364/518, 521, 300; 340/747, 721, 723

[56] References Cited

U.S. PATENT DOCUMENTS

| | | | |
|---|---|---|---|
| 4,455,619 | 6/1984 | Masui et al. | 364/300 |
| 4,564,901 | 1/1986 | Tomlinson et al. | 364/300 |
| 4,570,217 | 2/1986 | Allen et al. | 364/300 X |
| 4,586,158 | 4/1986 | Brandle | 364/300 |
| 4,587,628 | 5/1986 | Archer et al. | 364/900 |
| 4,598,284 | 7/1986 | Ikegami et al. | 340/750 |
| 4,692,858 | 9/1987 | Redford et al. | 364/200 |

OTHER PUBLICATIONS

Pullin, "Device-Independent Dynamic Control of Display Devices", IBM TDB, vol. 25, No. 3A, 8/1982, p. 1154.
Gillis, "Method for Incorporating Data Base Field Definitions on a Display Format", IBM TDB, vol. 25, No. 7A, 12/82, pp. 3249-3251.
Goldstein et al., "Advanced BASIC and Beyond for IBM PC", Robert J. Brady Co., 1984, pp. 303-308.
Kernighan et al., "The UNIX Programming Environment", Prentice-Hall, 1984, pp. 201, 279.
Lorin et al., "Operating Systems", Addison-Wessley, 1981, p. 153.

Primary Examiner—Raulfe B. Zache
Assistant Examiner—Thomas C. Lee
Attorney, Agent, or Firm—C. Lamont Whitham; Michael E. Whitham

[57] ABSTRACT

A method for generating display screens for a set of application programs allows application programmers to write programs without having to code the specific locations on a computer display screen where information and data are to be displayed in fields of various display screens of the set of application programs. A series of screen management subroutines are callable from an application program. A display screen is defined by loading one or more arrays of screen specification data indicative of information and data to be displayed. The display screen may be defined by loading the arrays by an application program using data contained in a screen driver file or alternatively by supplying the data to the arrays by means of data statements. The display screen is managed by calling subroutines to read screen specifications, to display screen headings, to display data fields and to read data fields. In addition, a subroutine is executed once per application program to dimension the arrays by specifying the size of the arrays, the number of elements in an array being the number of data statements defined for the largest screen to be processed by the program plus one.

5 Claims, 28 Drawing Sheets

| | | |
|---|---|---|
| ASMSETCOL | 0 = | SET COLOR |
| ASMDSPSFLD | 1 = | DISPLAY FIELD |
| ASMDSPIPS | 2 = | DISPLAY IN PROCESS |
| ASMDSPSMSG | 3 = | DISPLAY ERROR MESSAGE |
| ASMINPIPS | 4 = | DISPLAY INPUT IN PROCESS |
| ASMDSPSOUT | 5 = | DISPLAY OUTPUT FIELDS |
| ASMDSPSHLP | 6 = | DISPLAY HELP TEXT |
| ASMINPSCN | 7 = | INPUT SCREEN |
| ASMDSPSINP | 8 = | DISPLAY INPUT CAPABLE FIELDS |
| ASMDSPSDSC | 9 = | DISPLAY FIELD DESCRIPTORS |
| ASMOBTEMSG | 10 = | OBTAIN FSP ERROR MESSAGES |

FIG.1

```
03/30/83         Inventory Accounting          Add        3321b
Date              Transactions Last line no.      1
Last item no.      A12345          OUTPUT FIELDS Line no.           2                          A - Adjustment
Item no.           B55555                     C - Cost Adjustment
Description        Item Desc # B55555         I - Issue
Trans quantity         100                    O - Order
U/M                EA                         R - Receipt
Trans amount          1200.00                 S - Sale
Trans type         R(A,C,I,O,R,S,Y)           Y - Recount
Warehouse no.      1 (1,2,3)
Trans date         21683
Reference          PO1234

F1Help F2Status F8Reset F9Sign off
```

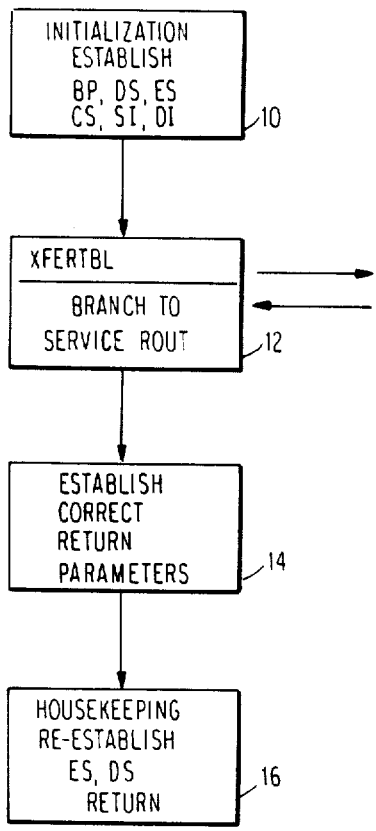

FIG.2

ASMSETCOL    0 = SET COLOR
ASMDSPSFLD   1 = DISPLAY FIELD
ASMDSPIPS    2 = DISPLAY IN PROCESS
ASMDSPSMSG   3 = DISPLAY ERROR MESSAGE
ASMINPIPS    4 = DISPLAY INPUT IN PROCESS
ASMDSPSOUT   5 = DISPLAY OUTPUT FIELDS
ASMDSPSHLP   6 = DISPLAY HELP TEXT
ASMINPSCN    7 = INPUT SCREEN
ASMDSPSINP   8 = DISPLAY INPUT CAPABLE FIELDS
ASMDSPSDSC   9 = DISPLAY FIELD DESCRIPTORS
ASMOBTEMSG  10 = OBTAIN FSP ERROR MESSAGES

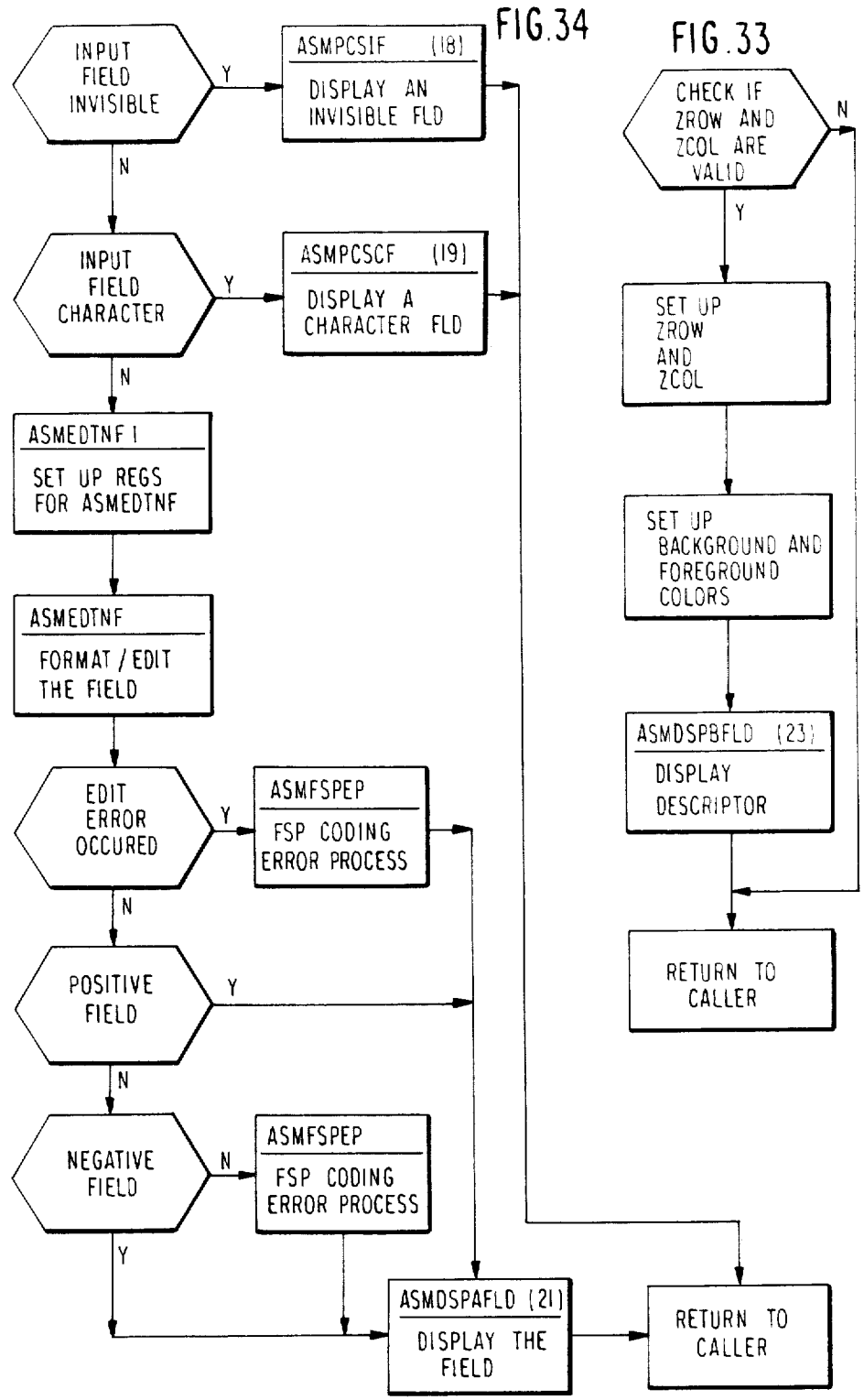

```
SET UP
OFFSET FOR
THIRD ARRAY
DIMENSION
   ↓
SET UP
FIRST TWO
ELEMENTS
OFFSET
   ↓
SET UP
OFFSET FOR
DROW
   ↓
SET UP
OFFSET FOR
DCOL
   ↓
SET UP
OFFSET FOR
ZROW
   ↓
SET UP
OFFSET FOR
ZCOL
   ↓
SET UP
OFFSET FOR  →  RETURN TO
UXFR           CALLER
ARRAY
```

FIG. 38

- OBTAIN UPPER BOUNDARY FOR FIRST DIMENSION
- SET UP OFFSET FOR ZLEN
- OBTAIN ZLEN
- SET UP OFFSET FOR ZDEC
- OBTAIN ZDEC
- SET UP OFFSET FOR ZHLP
- OBTAIN ZHLP → RETURN TO CALLER

FIG. 36

- INPUT FIELD PROTECTED? — Y → SET FOREGROUND AND BACKGROUND COLORS
- N ↓
- INPUT FIELD VERIFY? — Y → SET FOREGROUND AND BACKGROUND COLORS
- N ↓
- SET FOREGROUND AND BACKGROUND NORMAL COLORS
- ASMDSPFLD (34) DISPLAY THE INPUT FIELD
- RETURN TO CALLER

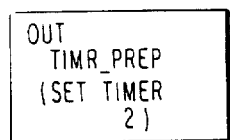
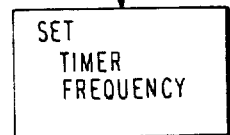
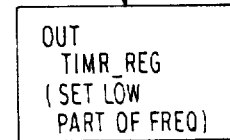
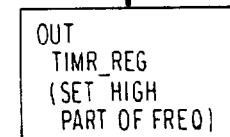
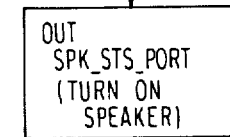
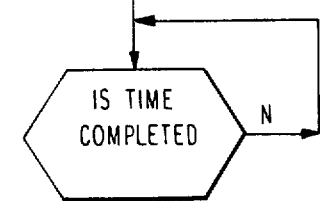
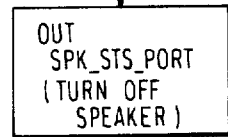
FIG. 42
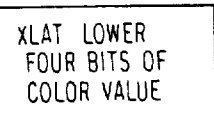
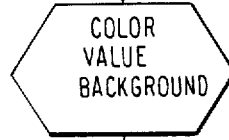
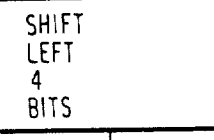
FIG. 41

FIG. 45 DATA ENTRY SCREEN

```
03/30/83                Inventory Accounting           Add              3321b
Data                        Transactions Line line no.        1
Last item no.        A12345

Line no.             2                                 A-Adjustment
Item no.             B55555                            C-Cost Adjustment
Description          Item Desc # B55555                I-Issue
Trans quantity           100                           O-Order
U/M                  EA                                R-Receipt
Trans amount             1200.00                       S-Sale
Trans type           R(A,C,I,O,R,S,Y)                  Y-Recount
Warehouse            1 (1,2,3)
Trans date           21683
Reference            P01234

F1Help  F2Status  F8Reset  F9Sign off
```

FIG. 46 STATUS SCREEN

```
03/30/83                Inventory Accounting                            3321c
Status                      Invoices Batch number       1    Session number  2      Session          Batch
                                               totals           totals Number of invoices                                 20              57
Total invoice amount                            1,310.50        5,678.92
Total cash discount allowable amount               13.10           56.78
Number of lines available                                          443

F2Data  F9Sign off
```

METHOD FOR GENERATING DISPLAY SCREENS FOR A SET OF APPLICATION PROGRAMS BY CALLING SCREEN MANAGEMENT SUBROUTINES

FIELD OF THE INVENTION

The subject invention generally relates to an interface between an application program and the system control program running on a micro or so-called "personal" computer and, more particularly, to an interface which allows application programmers to write programs without having to code the specific locations on the screen for the display of information and data in fields of various display screens.

DESCRIPTION OF THE PRIOR ART

Generally speaking, the facilities provided by microcomputers in the past for the display of data on a display screen and the reading of operator input have been somewhat inflexible. Writing data on the screen consisted of scrolling the new screen up from the bottom, one line at a time, while reading operator input usually required that the input had to be entered on the last line of the screen. With the introduction of personal computers along with high level intrepretive programming languages such as BASIC, screen handling became much more flexible. The programmer now had the capability to position the cursor anywhere on the screen and determine whether the cursor is visible or not. The programmer also had the capability of determining whether the keyed data is displayed on the screen, how the data should appear on the screen (i.e., normal, reverse image, high-lighted, underlined, etc.), as well as numerous other options. However, this flexibility was not free. Every one of the above-mentioned options, as well as seemingly simple tasks such as moving the cursor to the next position or to the next field, had to be programmed.

FIG. 1 illustrates a typical data entry screen. It contains thirteen data fields, five of which are output only and the remaining eight are available for the entering and/or updating of data by the operator. Using conventional screen handling facilities provided by the BASIC programming language, writing a program to display this screen, to read the input data fields, as well as supporting cursor movement keys and a tab forward or backward facility would take the average programmer about five days and would produce between 300 to 400 lines of executable code. The programming effort required to handle screen management functions such as this is unacceptable in product development.

SUMMARY OF THE INVENTION

It is therefore an object of this invention to provide an interface between the application programmer and the complex screen management of personal computers.

It is a further more specific object of the invention to provide support routines which handle such tasks as cursor movement, field-to-field transition, error-message display, and help-text display facilities thereby eliminating the need for the application programmer to program these screen management tasks.

It is another object of the invention to provide full screen processor routines which may be included in architecture standards that allow the application programmer to be concerned only with the three main functions of a screen processing program: (1) displaying screen headings and field descriptors, (2) displaying data fields, and (3) reading data fields entered by the operator.

According to the invention, the full screen processor routines are a series of screen management subroutines callable from an application program to provide the following functions:

1. Display in-process screen (constant only)
2. Display screen headings (constants as well as data fields)
3. Display history-area (constants as well as data fields)
4. Display status-area (constants as well as data fields)
5. Display other constants (constants as well as data fields)
6. Display field descriptors (constants)
7. Display data fields (data fields)
8. Read screen input These routines provide the capability to separate a screen layout into "windows" and to display only that section of the screen that has changed. This allows the programmer extreme flexibility in coding the application program while at the same time optimizing the performance of these screen-management routines. The programmer only has to use the routines applicable to the screen program. For example, a typical application program would normally only use five of the above routines; e.g., display in-process screen, display screen headings, display field descriptors, display data fields, and read screen input. The other three routines would be used by other, more specialized applications. As a specific example, the screen handling portion of the program for the data entry screen shown in FIG. 1 can be coded in six executable lines of code using the full screen processor routines according to the invention.

The full screen processor support routines define a screen using either data statements or application program arrays. Screen management is performed by four subroutine calls; i.e., read screen specifications, display screen headings and field descriptors, display data fields, and read data fields. Additional special purpose functions which are available include display of function key descriptors and display of help-text. The full screen processor support routines also alert the operator with a "beep" if an invalid key is pressed and high-lights the data field (and field descriptor) when the cursor is located at the data field. When the cursor moves to a numeric field, the full screen processor left justifies the field in the input area and right justifies the field when the cursor leaves the field. Error handling is by reverse imaging the data field or fields in error and display of an error message. The full screen processor does not allow the operator to leave a field in error until it is corrected, this feature being controlled by the application program.

The first step in using the full screen processor routines is to define a screen. For each data field or data field and associated descriptor, the full screen processor routines will use information contained in the following fields containd the full screen processor arrays:

ZROW—The row number of the data field
ZCOL—The column number of the data field
ZLEN—The length of the data field
ZTYPE$—The type of the data field
ZDSC$—The associated description The data to be contained in the above arrays can be supplied via data statements or can be loaded directly into the full screen processor arrays by the application program using data contained in screen driver files or the like. Once the screen has been defined, this section of the program will only have to be referenced again if there are any changes to the screen design; e.g., data field position, field type, descriptor change, and so on. Having defined the screen layout, the programmer can build the supporting code to handle the screen management of the screen. The full screen processor contains seven subroutines that the programmer can call with a CALL statement in the application program. These are (1) dimension FSP (full screen processor) arrays, (2) read screen specifications, (3) display headings and field descriptors, (4) display data fields, (5) read input, (6) display function key descriptors, and (7) display help-text. Using the full screen processor subroutines described, a simple screen management program to display a screen such as shown in FIG. 1 can be coded in as little as six lines of executable code as listed below:

10 GOSUB 1000, Dimension FSP arrays
20 GOSUB 2000, Read screen specifications
30 GOSUB 3000, Display headings and field descriptors
40 GOSUB 4000, Read input
50 GOSUB 5000, Display data fields
60 GOTO 40, Read next field The above code is a simplistic example of a screen handler program but it illustrates the basic actions required for the screen management portion of a typical application program. For a practical application program, additional code may be required for such functions as editing, processing of function key requests, calculations, accessing data files, and so forth.

BRIEF DESCRIPTION OF THE DRAWINGS

The foregoing and other objects, aspects and advantages of the invention will be better understood from the following detailed description of a preferred embodiment of the invention with reference to the accompanying drawings, in which:

FIG. 1 is an illustration of a typical data entry screen which might be displayed by a personal computer application program;

FIG. 2 is a flow chart of the full screen processor router routine indicating the several modules to which the router routine may branch;

FIG. 19 is a flow chart of a module to determine if "truncation" is required on a character field and then display it;

FIG. 25 is a flow chart of a module to determine if sound is supported and make a "field" sound when sound is supported;

FIG. 33 is a flow chart of a module to display an input field descriptor on the screen;

FIG. 34 is a flow chart of a module to display a specified input field;

FIG. 36 is a flow chart of a module to set the colors for and display an input capable field on the screen;

FIG. 38 is a flow chart of a module to obtain the screen information from the ZMSFP array which resides in the Business BASIC data segment;

FIG. 41 is a flow chart of a module to convert a color element, which is two bytes, from a string value to a BIOS binary value;

FIG. 42 is a flow chart of a module to generate sound;

FIG. 45 is an illustration of a data entry screen generated using the full screen processor support routings according to the invention; and FIG. 46 is an illustration of a status screen generated using the full screen processor support routines according to the invention.

DETAILED DESCRIPTION OF A PREFERRED EMBODIMENT OF THE INVENTION

Figure 3:
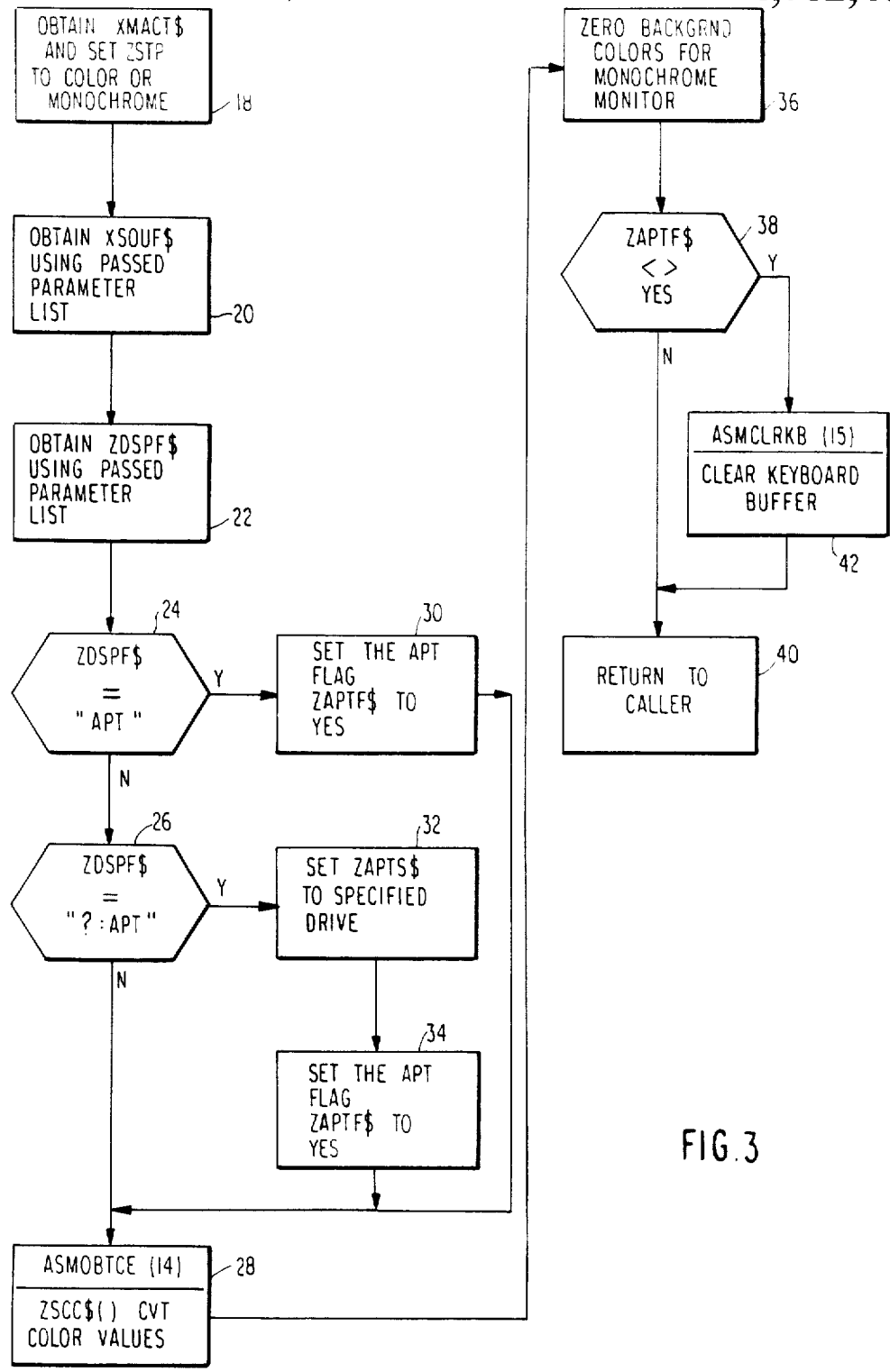
FIG. 3 is a flow chart of the set color module which moves the static full screen processor information to the full screen processor data segment.

The full screen processor routines according to the present invention and outlined above are described in more detail below. The description given is for a specific preferred embodiment which uses the IBM Personal Computer. For details of this specific computer, reference may be had to the *Technical Reference*, IBM Personal Computer Hardware Reference Library, publication number 6025005, revised edition (July 1982).

1. Display in-process screen—An in-process message is displayed, centered on line 10 of the screen, and control is returned to the application program.

2. Display screen headings—Constants and application-formatted output fields are displayed on the screen, and control is returned to the application program.

3. Display history-area—Constants and output fields are displayed on the screen. Numeric data-fields are formatted by the full screen processor to include commas, decimal point, and a trailing minus sign. Control is returned to the application program.

4. Display status-area—Constants and output fields are displayed on the screen. Numeric data-fields are formatted by the full screen processor to include commas, decimal point, and a trailing minus sign. Control is returned to the application program.

5. Display other constants—Constants are displayed on the screen, and control is returned to the application program.

6. Display field descriptors—Field descriptors associated with screen data-fields are displayed on the screen, and control is returned to the application program.

7. Display data-fields—Data fields (input as well as output) are displayed on the screen. Numeric data-fields are formatted by the full screen processor to include decimal point, and a leading minus sign. Control is then returned to the application program.

8. Read screen input—This function is comprised of the following subfunctions:

a. At the beginning of each field, the operator is "beeped". By a "beep", what is meant is that a tone is generated by the application program.

b. When the cursor is on the current data-field, the field as well as the associated descriptor is highlighted. If the input field is numeric, the field content is formatted and is left-aligned in the data-field area.

c. Active function key descriptors are displayed.

d. During field entry, depending on the field attribute specified, lower-case alphabetics may be displayed as upper-case.

e. If the operator requests "help" by using the function key F1, the appropriate help-text for the current data-field is retrieved by a call to a subroutine and is displayed. The help-text remains displayed until the operator successfully exits the current field.

f. If the operator attempts to leave the field via one of the function keys F2 to F10, an edit is performed to determine whether the function key is active. If the key is not active, an error message is displayed. If the key is active, the data-field and associated descriptor is reset to normal intensity. If a numeric data-field, it is formatted and right-aligned in the data-field area. Control is then returned to the application program.

g. If the operator attempts to leave the field via the Enter/End, Tab, or Home keys, the data-field and associated descriptor is reset to normal intensity. If a numeric data-field, it is formatted and right-aligned. Control is then returned to the application program. There are two variables that can be tested to determine which key was used by the operator to return to the application program. The command variable ZCMD will contain a 0 if the Enter/End, Tab or Home keys were used. It will contain 2 through 10 if function keys F2 through F10 were used. If the application program is interested in knowing which field-exit key was used (i.e., ZCMD=0), the key variable ZKEY will contain the following values:
   ZKEY=41 Enter/End key
   ZKEY=42 Tab key
   ZKEY=43 Home key
   Using two variables to convey the key information makes it easier for the application programmers to test for a nonfunction key return when it is immaterial whether the Enter/End, Tab, or Home keys were used.

h. When the application program re-enters the read screen-input routine with a pending error-message, all data-fields in error are displayed in reverse image, and the specified error-message is displayed. The cursor is located at the first data-field in error. If no error message is pending, the cursor is moved to the next, previous, or first input data-field, depending on the key pressed by the operator. Alternatively, the cursor can be moved to any other input field under the control of the application program. The read screen-input routine is then restarted at step a.

The following information is required for each field on the screen:

Data Fields
  Row
  Column
  Type (i.e., input, protected, verify, invisible)
  Attribute (i.e., alphanumeric, numeric)
  Length
  Number of decimal places
  Output format (i.e., date, social security number, telephone number)
  Help-text index
  Associated descriptor row
  Associated descriptor column
  Associated descriptor "text"
  Data-field content
Headings and other constants
  Row
  Column
  Constant The above information is maintained in screen-driver files and is read into appropriate full screen processor arrays or data statements are used in a load screen array routine at program start-up. The application programs will supply this information via DATA-statements which are then placed into the appropriate array elements.

The screen information required by the full screen processor for the following routines are contained in multi-dimension arrays, and this data is shared across screens in an application program.

1. Display screen headings
2. Display history-area
3. Display status-area
4. Display other constants The information contained in the above screen "windows" is usually similar from screen to screen, and sharing this information across screens reduces the amount of storage required to contain the full screen processor data required for these "windows". Once the initial values have been defined for these screen areas, it is usually only required that one or two fields (e.g., screen ID) be changed to reflect the requirements of the next screen to be processed.

The arrays used by the above routines are as follows:
Screen Window Parameters—Array ZMSWP
  ZMSWP (ww,ff,ee) where ww—window type
    1 = Headings
    2 = History
    3 = Status
    4 = Other
    ff—field
    ee—element
    ee = 1 Row of data-field
    ee = 2 Column of data-field
    ee = 3 Row of constant
    ee = 4 Column of constant
    ee = 5 Xfer pointer to ZMWFP and ZMWFT$ arrays
Window Field Parameter—Array ZMWFP
  ZMWFP (xfer, ee)
    ee = 1 Field attribute
    ee = 2 Length
    ee = 3 Number of decimal places
    ee = 4 Output format
Window Field Text—Array ZMWFT$
  ZMWFT$ (xfer, ee)
    ee = 1 Descriptor "text"
    ee = 2 Data-field content The screen information required by the full screen processor routines "Display field descriptors", "Display data-fields", and "Read screen-input" are contained in multi-dimensional arrays which are defined as follows:
Screen Field Parameters—Array ZMSFP
  ZMSFP (ss, ff, ee) where
    ss—screen
    ff—field
    ee—element
    ee = 1 Row of data-field
    ee = 2 Column of data-field
    ee = 3 Row of descriptor
    ee = 4 Column of descriptor
    ee = 5 Xfer pointer to ZMRFP and ZMRFT$ arrays
Record Field Parameter—Array ZMRFP
  ZMRFP (xfer, ee)
    ee = 1 Field attribute
    ee = 2 Length
    ee = 3 Number of decimal places
    ee = 4 Output format
    ee = 5 Type
    ee = 6 Help-text index
Record Field Text—Array ZMRFT$
  ZMRFT$ (xfer, ee)
    ee = 1 Descriptor "text"
    ee = 2 Data-field content The following data-field types can be defined:
1. Input field
2. Protected field (output only)
3. Verify field (output only)
4. Invisible field (operator does not see keyed data)

The data-field attributes, along with the allowable values that can be entered, are as follows:
1. Alphanumeric (upper case)—ASCII 32-126
2. Alphanumeric (lower case/ upper case—ASCII 32-126
3. Numeric (positive, negative and zero values)—ASCII 45, 46 and 48-57
4. Numeric (positive values only)—ASCII 45, 46 and 48-57
5. Numeric (positive or zero values)—ASCII 46 and 48-57
6. Numeric (negative values only)—ASCII 45, 46 and 48-57
7. Numeric (negative or zero values)—ASCII 45, 46 and 48-57
8. Numeric (positive or negative values)—ASCII 45, 46 and 48-57

Note that if the field-attribute is "1", lower-case letters entered by the operator are automatically converted to upper-case before being displayed on the screen. If a field is defined with an attribute of 4 or 5, a minus-sign keyed by the operator (ASCII 45) will be accepted by the full screen processor. However, an error-message will be issued at field-end edit.

The output format codes are used to signify that special formatting of data-fields is required. These are as follows:
1. Date field
2. Telephone number field
3. Social security field Numeric data-fields, such as dollar amounts and quantities are formatted by the full screen processor routines when they are displayed on the screen. Double-precision numbers are rounded to the number of decimal places specified, and any excess decimal places are dropped.

Special numeric data-fields, such as dates, telephone numbers, and social security numbers, are formatted by the full screen processor when they are displayed on the screen. Note, however, that this applies to output data fields only.

The first step in using the full screen processor is defining a screen. For each data-field, or data-field and associated descriptor, the full screen processor routines use the information contained in the array fields ZROW, ZCOL, ZLEN, ZTYPE$, ZPOS, and ZDSC$. Once the screen has been defined, this section of the program will only have to be referenced again if there are any changes to the screen design.

For example, assume the following screen segment:

|  | Col 2 | Col 18 |
|  | ↓ | ↓ |
| Row 10: → | Item no. | XXXXXXXXXXXX |
| Row 11: → | Description | XXXXXXXXXXXXXXXXX |
| Row 12: → | Trans quant | 9999999999 |

To support the above screen segment, the following information is required:
DATA 10, 2, 10, 18, 12, C, 2, "Item no."
DATA 11, 2, 11, 18, 17, P,2, "Description"
DATA 12, 2, 12, 18, 10, N, 2, "Trans quant"

Note that the "Description" data-field has been defined as a "protected" data-field; i.e., field of type "P". This means that this is an output field only, and the operator cannot change this field. Associating a descriptor with a data-field provides the optional capability of high-lighting the field-descriptor along with the data-field when the cursor is positioned at the data-field. That a descriptor is to be high-lighted along with the data-field is signified by setting switch ZHLD=1 in the initialization section of the application program. Initializing this field to zero indicates to the full screen processor that field-descriptors are not to be high-lighted.

Once the screen layout has been defined, the programmer can build the supporting code to handle the screen management of his screen. The full screen processor facility contains seven subroutines that the programmer can call with a GOSUB statement in the application program.

1. Dimension FSP arrays—This routine is executed once per program and is used to specify the size of the full screen processor (FSP) arrays. The number of elements in the arrays is the number of DATA statements defined for the largest screen to be processed by the program, plus one.

2. Read screen specifications—This routine is used once per screen and will read the screen information contained in the DATA statements into the appropriate FSP arrays. If the screen information is contained in driver-files, a user routine can be executed instead of the supplied routine to load the FSP arrays with the required information.

3. Display headings and field-descriptors—. This routine uses the information contained in the FSP arrays to display the constant data (headings, field descriptors, etc.) on the screen.

4. Display data-fields—This routine displays the contents of all data-fields on the screen.

5. Read input—This routine is executed to read an operator entered data-field from the screen. Each time the operator use some of the special function keys to leave a data-field, such as Enter, Tab, End, or Home, control is passed back to the application program, along with the contents of the screen input fields. The data to be displayed is contained in the FSP field ZDATA$.

6. Display function key descriptions—This is an optional routine that can be used to display the program's active function key descriptors on the screen.

7. Display help-text—This is an optional routine that can be used to display help-text on the screen.

Using the full screen processor subroutines described above, a screen program to display a screen, and to read each input field as well as supporting all of the special function keys, can be coded.

The information that the full screen processor routines use to communicate with an application program regarding the screen management functions to be performed will now be described. The arrays which are used to contain the specifications of the screens have been previously described. In addition, other variables used by the full screen processor routines are described below:

ZFLDS—This variable contains the number of fields comprising the screen layout. If the FSP arrays are loaded from DATA statements, this variable is automatically calculated. If the FSP arrays are loaded from a driver file, for example, this variable will have to be updated to indicate the number of fields contained in a current screen.

ZDATA$—This is the field used by the full screen processor to store the contents of the data-fields to be currently used by the program.

ZCMD—The content of this field indicates which key the operator pressed. A value of 1 to 10 corresponds to function keys F1 to F10. If ZCMD contains a 0, the operator attempted to leave the current data-field by pressing the Enter, Tab, End, or Home key. If the programmer cares which one of the field-exit keys was pressed, he can test the FSP variables ZKEY$ for the value of the key.

ZCMD$—This is the string value of ZCMD with the leading blank removed.

ZKEY$—If ZCMD=0, then ZKEY$ will contain the value of the field-exit key.

ZHLD—This field is used to indicate to the full screen processor whether field descriptors should be high-lighted along with the data-field.

ZMSG$—This array is used to contain the error messages to be used by the application program.

ZMSGN—This variable contains the number of messages in the ZMSG$ array.

ZRMSG—This field is used to tell the full screen processor which error message should be displayed on the screen.

ZERR—This is an array used to tell the full screen processor which data-fields are in error.

ZFKEY$—This array contains the descriptions of the function keys for the application program.

ZHELP$—This array contains the help-text associated with a particular data-field.

The several drawing figures beginning with FIG. 2 provide detailed flow charts from which a programmer of ordinary skill in the art can write code in any one of a variety of programming languages, the specific language being the choice of the programmer based on his individual knowledge of the language and the particular computer and/or operating system on which the program is to be run. In the preferred embodiment, the language used is ASSEMBLER for the Intel 8088 microprocessor used in the IBM Personal Computer. The choice of the 8088 ASSEMBLER language was made to minimize the machine code, but a higher level language such as, for example, C could be used. The flow charts illustrate a modular approach taken in writing the program wherein one module may call one or more other modules, and a module may, in turn, be called by one or more other modules. In the convention adopted in the drawings, a call to a module within another module is indicated by the name of the called module followed by a number in parentheses, this number indicating the drawing figure number where the flow chart for the called module may be found. Calls are also made by some modules to the IBM Personal Computer BIOS (basic input/output system). The *Technical Reference, IBM Personal Computer Hardware Reference Library,* referred to herein above, contains a description of the ROM (read only memory) BIOS in Section 3, and the ROM BIOS listings may be found in Appendix A of the *Technical Reference.*

FIG. 2 shows the flow chart for the full screen processor router routine. This flow chart may be considered as a sort of "table of contents" to the full screen processor since the function of this routine is to branch to one of several full screen processor modules. In FIG. 2, the first step is an initialization step as indicated by block 10. Once the process is initialized, it goes to block 12 which branches to the appropriate service routine. This is accomplished by means of a transfer table XFERTBL. Any one of eleven modules numbered 0 to 10 may be branched to by this service routine. When the processing is complete in the particular module branched to, control returns to the router routine which then, in block 14, establishes the correct return parameters and, in block 16, performs housekeeping tasks.

Figure 14:
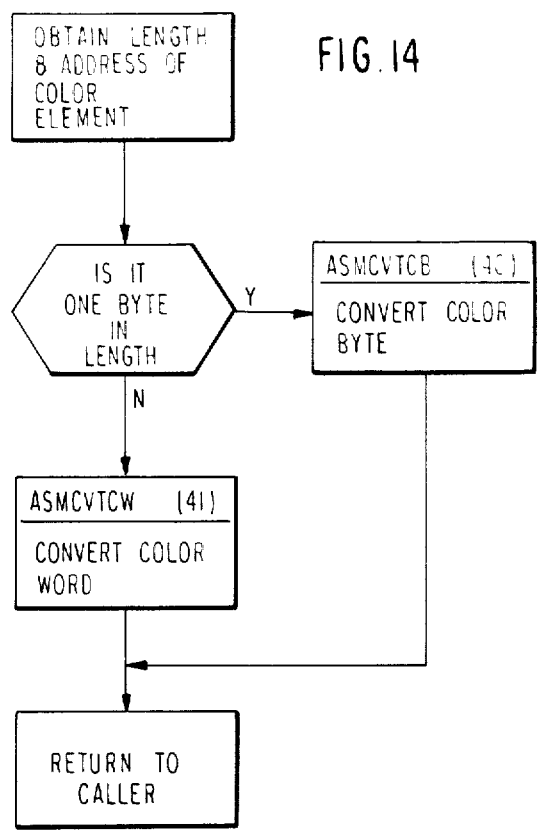
FIG. 14 is a flow chart of a module called by the set color module shown in FIG. 3 to obtain a color element and convert it to a binary value.

The first of the eleven modules listed in the flow chart of FIG. 2 is the module to set color, ASMSETCOL. This module is shown in FIG. 3 and is used to move the static full screen processor information to the full screen processor data segment, including XMACT$, ZSTP, XSOUF$, ZDSPF$, and ZSCC$( ). Upon branching to set color module, the XMACT$ data is first obtained in block 18, and ZSTP is set to either color or monochrome as specified. Then, in block 20, the XSOUF$ data is obtained using the passed parameter list and, in block 22, the ZDSPF$ data is obtained again using the passed parameter list. ZDSPF$ is compared with "APT" in block 24, and if the comparison is negative indicating that APT is not active, ZDSPF$ is compared with "?:APT" in block 26. Again, if the comparison is negative indicating that no drive is specified, the process goes to block 28 where the color element is obtained from ZSCC$( ) by calling the ASMOBTCE module shown in FIG. 14, and the color element is converted to a binary value. Returning for the moment to blocks 24 and 26, the APT module is used for troubleshooting and does not form a part of the subject invention. It is therefore not included in this disclosure although references are made to this module to show its relative positions in the several processes. In block 24, if the comparison is positive, then in block 30 the APT flag ZAPTF$ is set to "yes" indicating that APT is active, and the process goes to block 28. Similarly, if the comparison in block 26 is positive, ZAPTS$ is set to the specified drive in block 32 and, in block 34, the APT flag ZAPTF$ is set to "yes" before proceeding to block 28.

Figure 15:
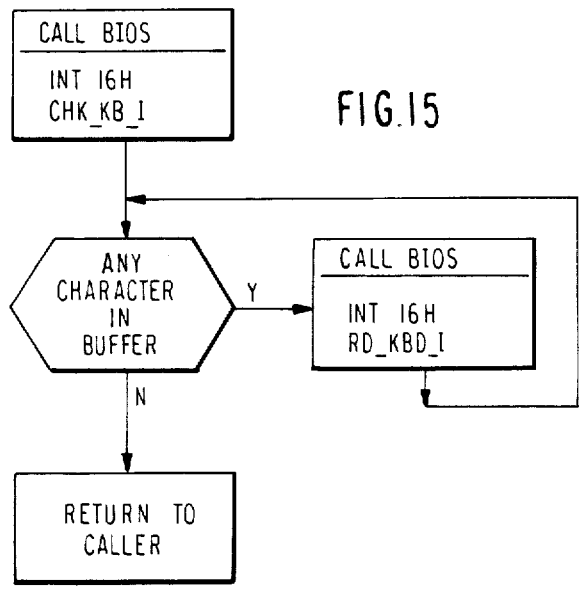
FIG. 15 is a flow chart of a module to clear the keyboard buffer;.

Once the color elements have been obtained and converted to binary values in block 28, the background colors for a monochrome monitor, is one is used, are zeroed in block 36. The APT flag ZAPTF$ is then checked in block 38 to determine if it had been set to "yes". If not, the module returns to the router routine shown in FIG. 2, as indicated by block 40; otherwise, the keyboard buffer is first cleared in block 42 before returning to the router routine. The keyboard is cleared by calling the ASMCLRKB module shown in FIG. 15.

Figure 4:
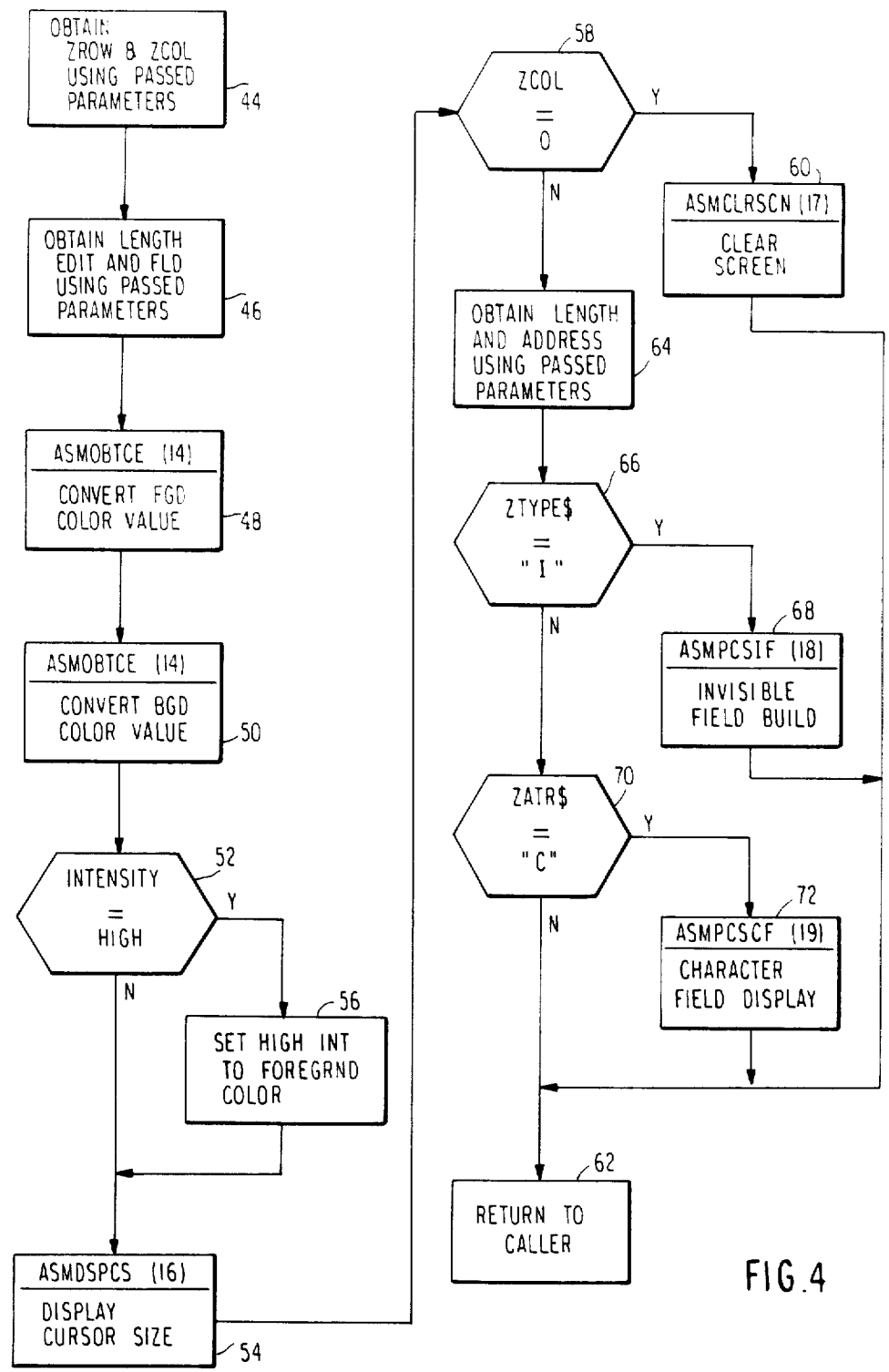
FIG. 4 is a flow chart of the display field module which displays a user specified field or clears the screen.

The second module to which the router routine of FIG. 2 may branch is the display field module shown in FIG. 4. This module displays a "user specified" field or clears the screen. The first step performed by this module is to obtain the ZROW and ZCOL data using passed parameters, as indicated in block 44. Then, in block 46, the length, edit attribute and field type are obtained using passed parameters. The foreground color is converted in block 48 by calling module ASMOBTCE shown in FIG. 14, and the background color is converted in block 50 also by calling module ASMOBTCE. The intensity is then checked in block 52 to determine if it is high and, if not, the cursor is removed in block 54 by calling the ASMDSPCS module shown in FIG. 16; otherwise, the high intensity is set to the foreground color in block 56 before proceeding to block 54.

Figure 17:
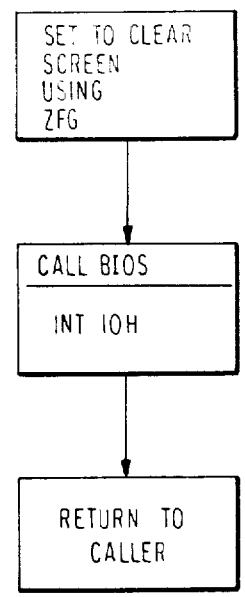
FIG. 17 is a flow chart of a module to clear the screen with the current foreground attribute.

The next step in the display field module is to check for a clear screen operation. This is done by determining if the ZCOL data is equal to zero, as indicated in block 58. If it is, then the screen is cleared in block 60 by calling module ASMCLRSCN shown in FIG. 17, and the process returns to the router routine shown in FIG. 2 as indicated by block 62. On the other hand, if a clear screen operation is not called for, the length and address of the data to be displayed is obtained using passed parameters in block 64. At this point a series of tests are made. First, ZTYPE$ is checked for the "I" attribute in block 66 indicating an invisible field and, if the test is positive, an invisible field is built in block 68 by calling module ASMPCSIF shown in FIG. 18. If the test is negative, ZATR$ is checked for the "C" attribute in block 70 indicating a character field and, if the test is positive, a character field is displayed in block 72 by calling module ASMPCSCF shown in FIG. 19. If this test is negative, the module exits at block 62. In addition, after any of the operations in blocks 68 or 72, the module exits at block 62.

Figure 5:
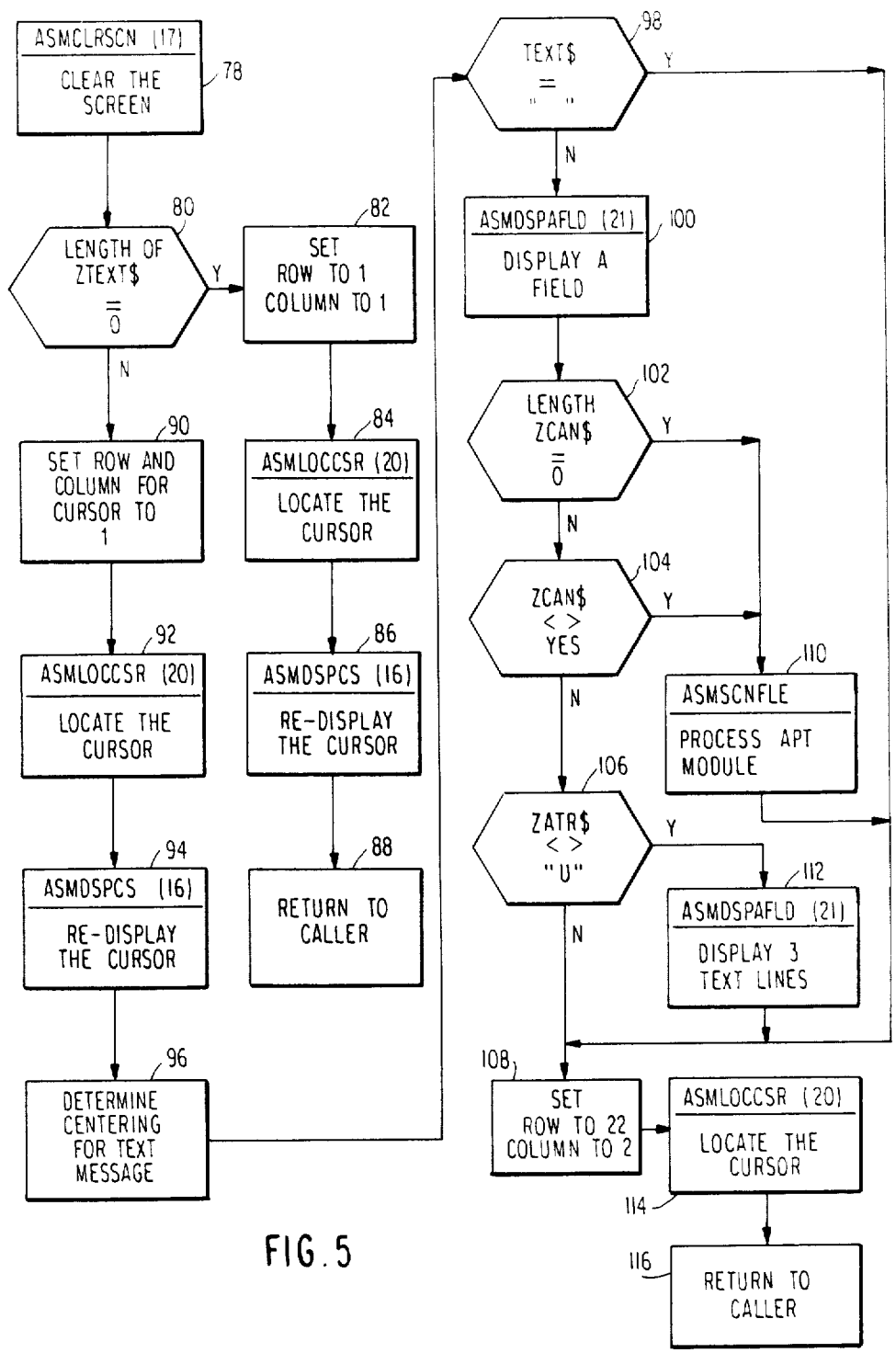
FIG. 5 is a flow chart of the display in process module which displays a user specified in process message on the screen or to turn the cursor back on or to clear the screen.

The third module to which a branch may be made by the router routine of FIG. 2 is the display in process module. This module is shown in FIG. 5 and displays "user specified" in process messages on the screen. This module can also be called to turn the cursor back on or to clear the screen. The first step in block 78 of the module is to clear the screen. This is done by calling the module ASMCLRSCN shown in FIG. 17. Then, in block 80, the string pointers for TEXT$ are obtained and checked for a null, i.e. length of ZTEXT$ is equal to zero. A null specifies a clear screen and to turn the cursor back on. If a null is found, then in block 82 the row and column are both set to one. The cursor is then located in block 84 by calling the locate cursor module, ASMLOCCSR shown in FIG. 21, and in block 86, the cursor is re-displayed by calling the module ASMDSPCS. At this point, the process returns to the caller, which in this case is the router routine shown in FIG. 2.

Figure 16:
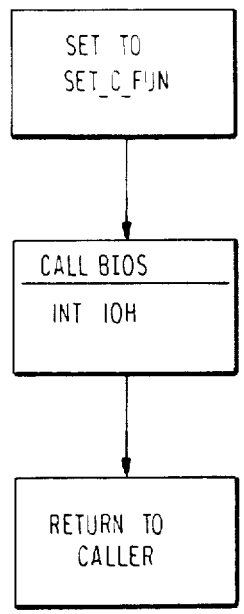
FIG. 16 is a flow chart of a module to display the cursor in the size specified by the input registers and may be used to "remove" the cursor from the screen or redisplay it.
Figure 20:
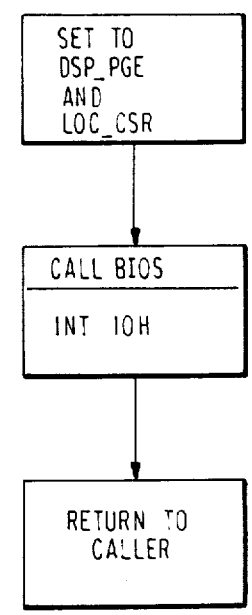
FIG. 20 is a flow chart of a module to locate the cursor to a specified position on the screen.
Figure 21:
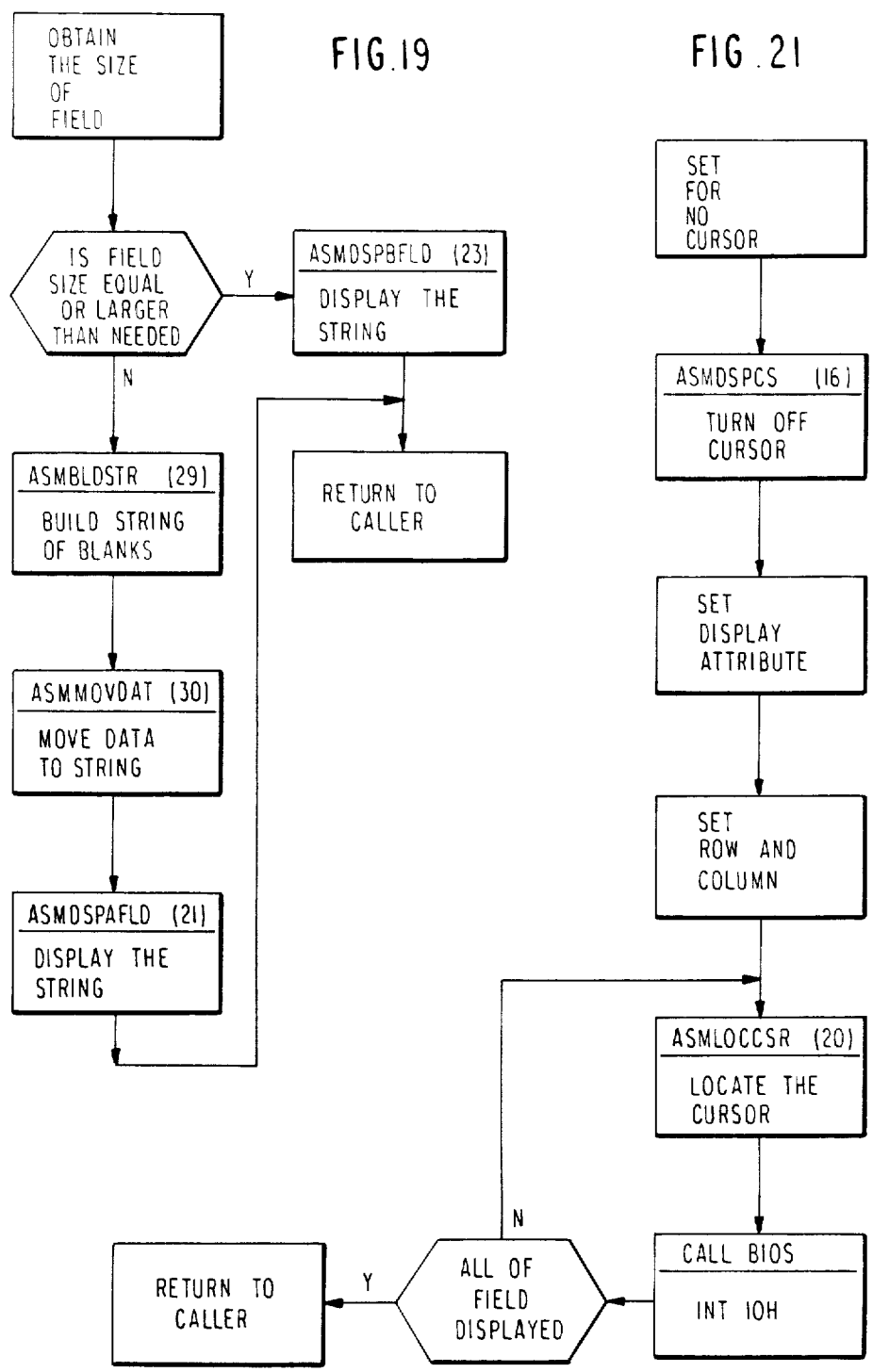
FIG. 21 is a flow chart of a module to display a field residing within the full screen processor data segment.
Figure 22:
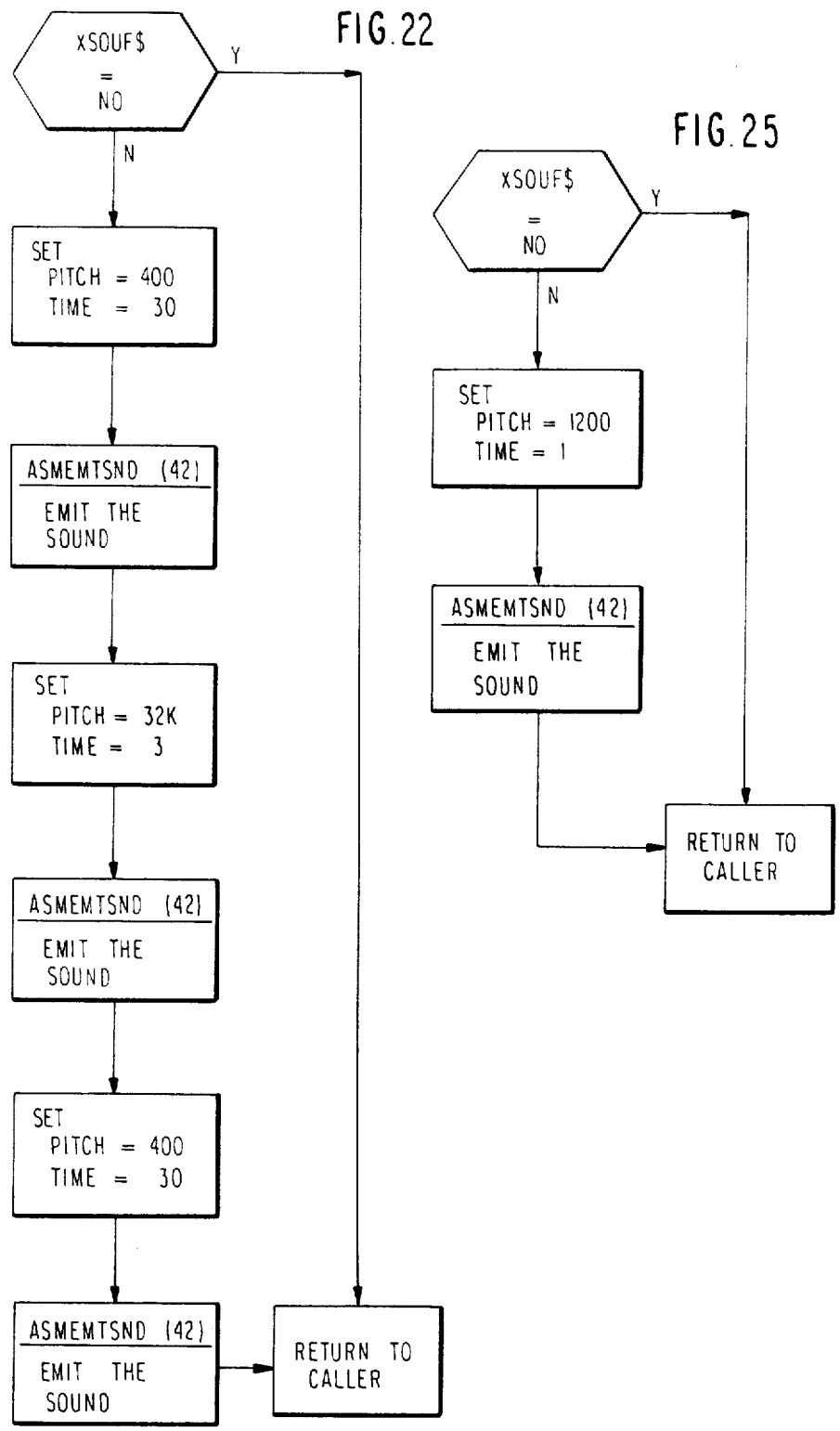
FIG. 22 is a flow chart of a module to determine if sound is supported and make an error sound when sound is supported.

Assuming that a null is not found in block 80, the row and column for the cursor is set to one in block 90. The ASMLOCCSR module shown in FIG. 21 is called in block 92 to locate the cursor, and the ASMDSPCS module shown in FIG. 16 is called in block 94 to re-display the cursor. In block 96, the centering for the text message is determined. The text string TEXT$ is checked in block 98 to determine if it is a blank indicating that a clear screen was all that was required. If not, a field is displayed in block 100 by calling the module ASMDSPAFLD shown in FIG. 22. Then ZCAN$ is checked to determine if it is a null in block 102. If not, ZCAN$ is checked to determine if the "yes" flag has been set in block 104, and if not, ZATR$ is checked in block 106 to determine if the upper case attribute "U" has been set. If not, the row is set to 22 and the column is set to 2 in block 108. If the test in block 98 is positive, the process goes directly to block 108. If either of the tests in blocks 102 or 104 are positive, then the APT module, mentioned previously, is processed in block 110 by calling an ASMSCNFLE module before proceeding to block 108. If the that in block 106 is positive, three text lines are displayed in block 112 by calling the ASMDSPAFLD module shown in FIG. 21 before proceeding to block 108. The next step in block 114 is to locate the cursor by calling the ASMLOCCSR module shown in FIG. 20. At this point, the display in process module returns to the caller as indicated by block 116.

Figure 6:
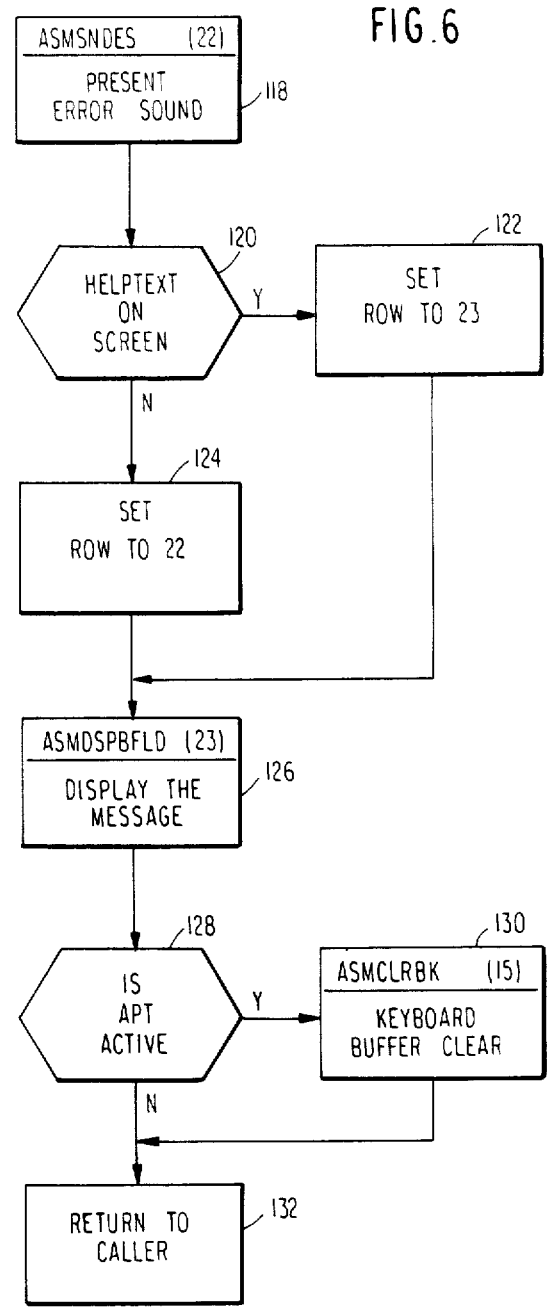
FIG. 6 is a flow chart of the display error message module which provides an error sound or "beep" and displays an error message on the screen.
Figure 23:
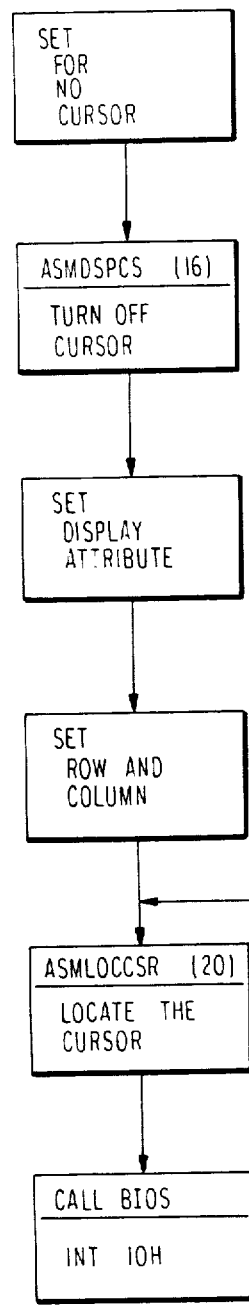
FIG. 23 is a flow chart of a module to display a field residing within the Business BASIC data segment.

The fourth module to which the router routine in FIG. 2 may branch is the display error message module shown in FIG. 6. This module provides an "error sound" and displays an error message on the screen. The first step in the module is to cause the error sound or "beep" to be made by calling the module ASMSNDES shown in FIG. 22, as indicated in block 118. A test is then made in block 120 to determine if a help text is to be displayed on the screen. If so, the row is set to 23 in block 122, but if not, the row is set to 22 in block 124. The message is displayed in block 126 by calling the module ASMDSPBFLD shown in FIG. 23. APT is then checked in block 128 to determine if it is active. If it is, the keyboard buffer is cleared in block 130 by calling the module ASMCLRKB shown in FIG. 15, and then the process exits by returning to the caller as indicated by block 132. If APT not active in block 128, the process returns directly to the caller.

Figure 7:
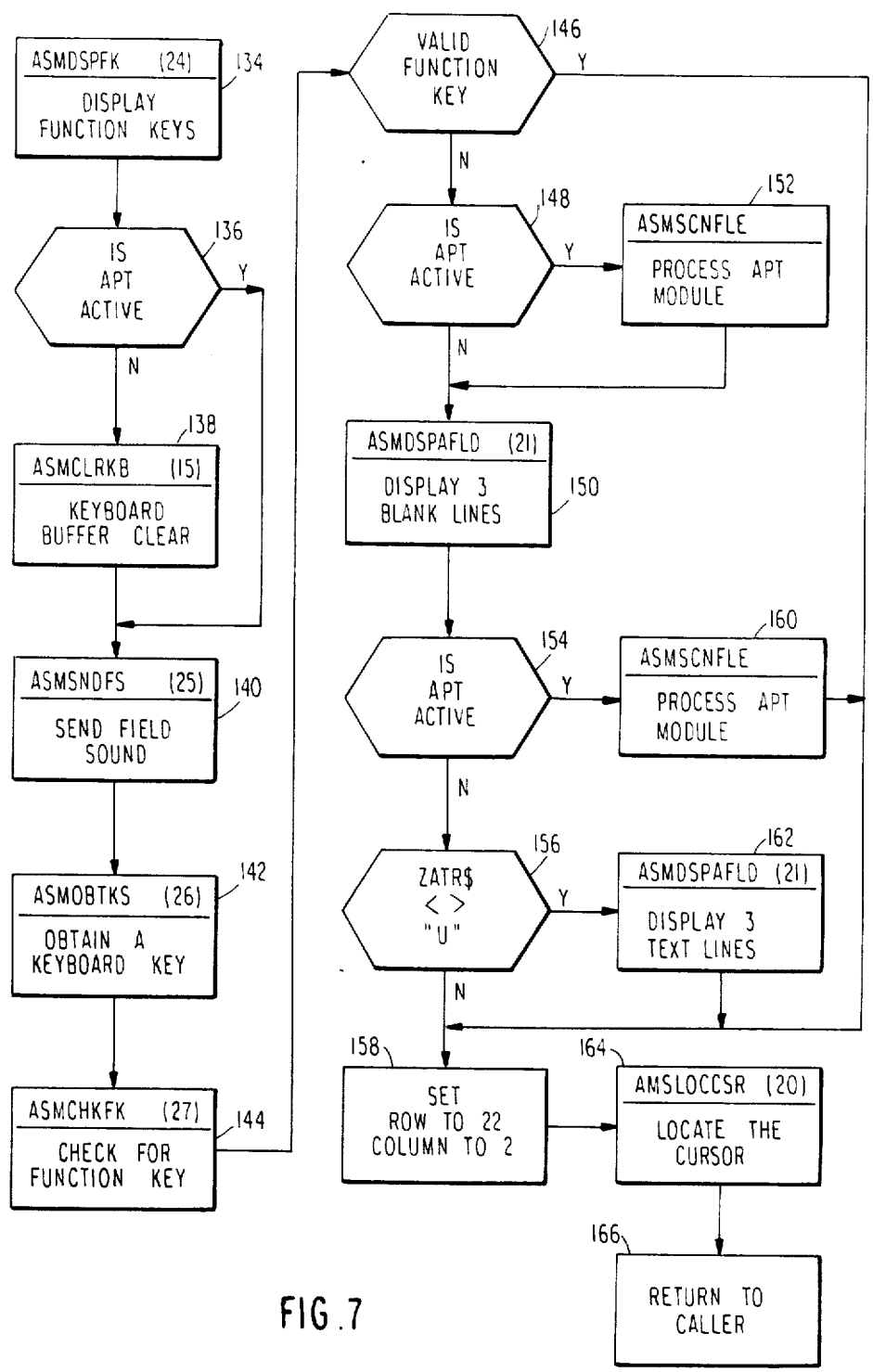
FIG. 7 is a flow chart of the display input in process module which displays an in-process screen consisting of an error message and an active function key display and then allows for keyboard entry, accepting only those function keys which are active.
Figure 26:
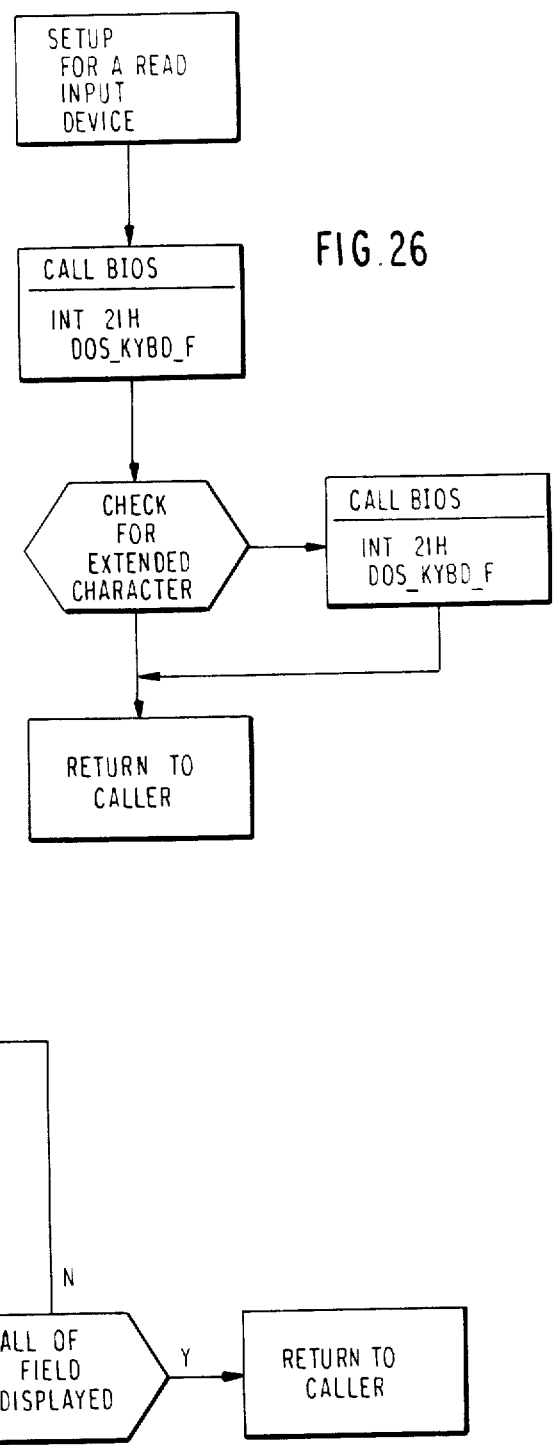
FIG. 26 is a flow chart of a module to obtain a keystroke from the keyboard.
Figure 24:
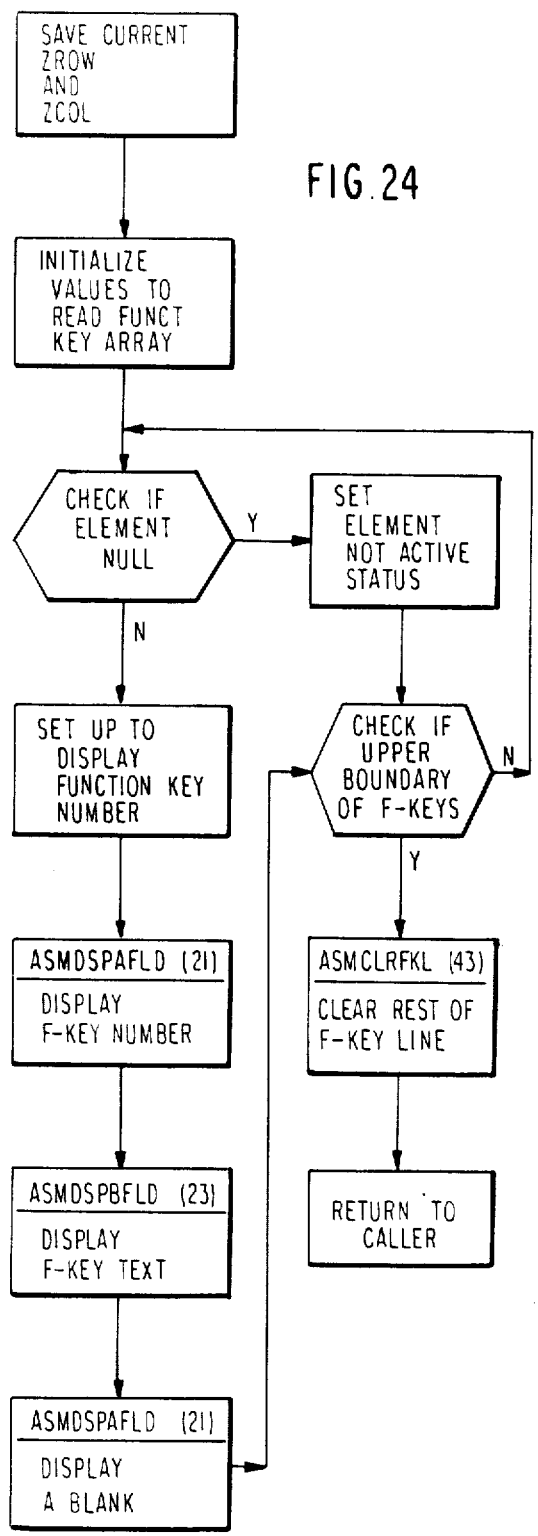
FIG. 24 is a flow chart of a module to display function keys.
Figures 27, 28:
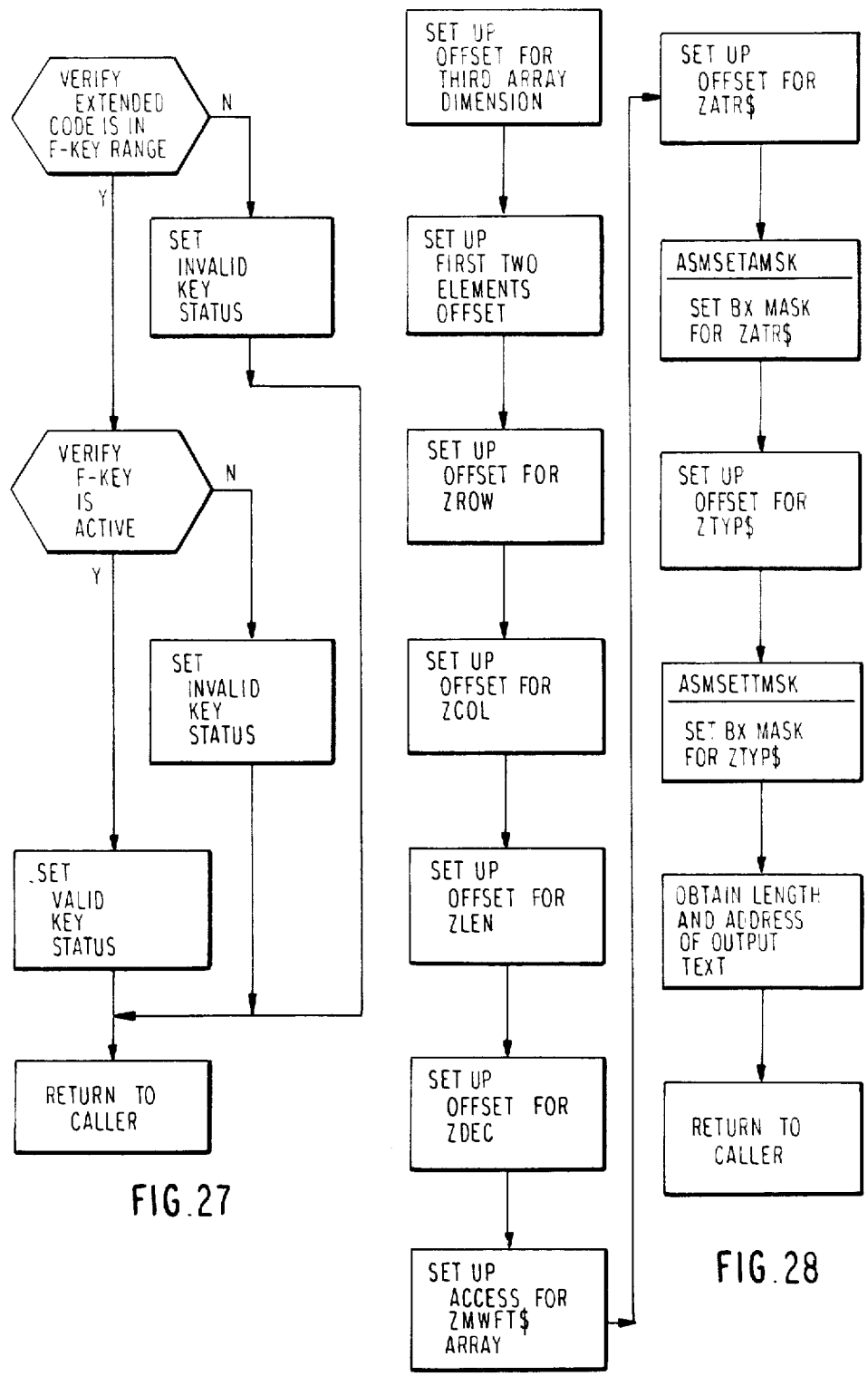
FIG. 27 is a flow chart of a module to check if a valid function key has been pressed on the keyboard.
FIG. 28 is a flow chart of a module to obtain the information for an output window field from the full screen processor array within the Business BASIC data segment.

The fifth module to which the router routine in FIG. 2 may branch is the display input in process module. This module is shown in FIG. 7 and displays an input in-process screen which consists of an error message display on line 22 and active function key display on line 24, and then allows for keyboard entry, accepting only those function keys which are active. The first step in the process is to display the function keys in block 134 by calling the module ASMDSPFK as shown in FIG. 24. APT is then checked in block 136 to determine if it is active. If it is not, the keyboard buffer is cleared in block 138 by calling the module ASMCLRKB shown in FIG. 15, and then the field sound is sent in block 140 by calling module ASMSNDFS shown in FIG. 25. If APT is active in block 136, the process goes directly to block 140. Next, a keyboard key is obtained in block 142 by calling module ASMOBTKS shown in FIG. 26, and a check for a function key is made in block 144 by calling module ASMCHKFK shown in FIG. 27. A check is then made in block 146 to determine if the key is a valid function key. If not, APT is checked to see if it is active in block 148. If APT is not active, three blank lines are displayed in block 150 by calling the ASMDSPAFLD module shown in FIG. 21; otherwise, the APT module is processed in block 152 by calling the ASMSCNFLE module before going to block 150. A check is again made in block 154 to determine if APT is active and, if it is not, a check is made in block 156 to determine if the upper case attribute "U" has been set for ZATR$. If not, the row is set to 22 and the column is set to 2 in block 158. If the test in block 146 is positive, the process proceeds directly to block 158. If the test in block 154 is positive, the APT module is processed in block 160 by calling the ASMSCNFLE module before proceeding to block 158. If the test in block 156 is positive, three text lines are displayed in block 162 by calling the ASMDSPAFLD module shown in FIG. 22 before proceeding to block 158. Next, the cursor is located in block 164 by calling the ASMLOCCSR module shown in FIG. 21 before returning to the caller as indicated by block 166.

Figure 8A:
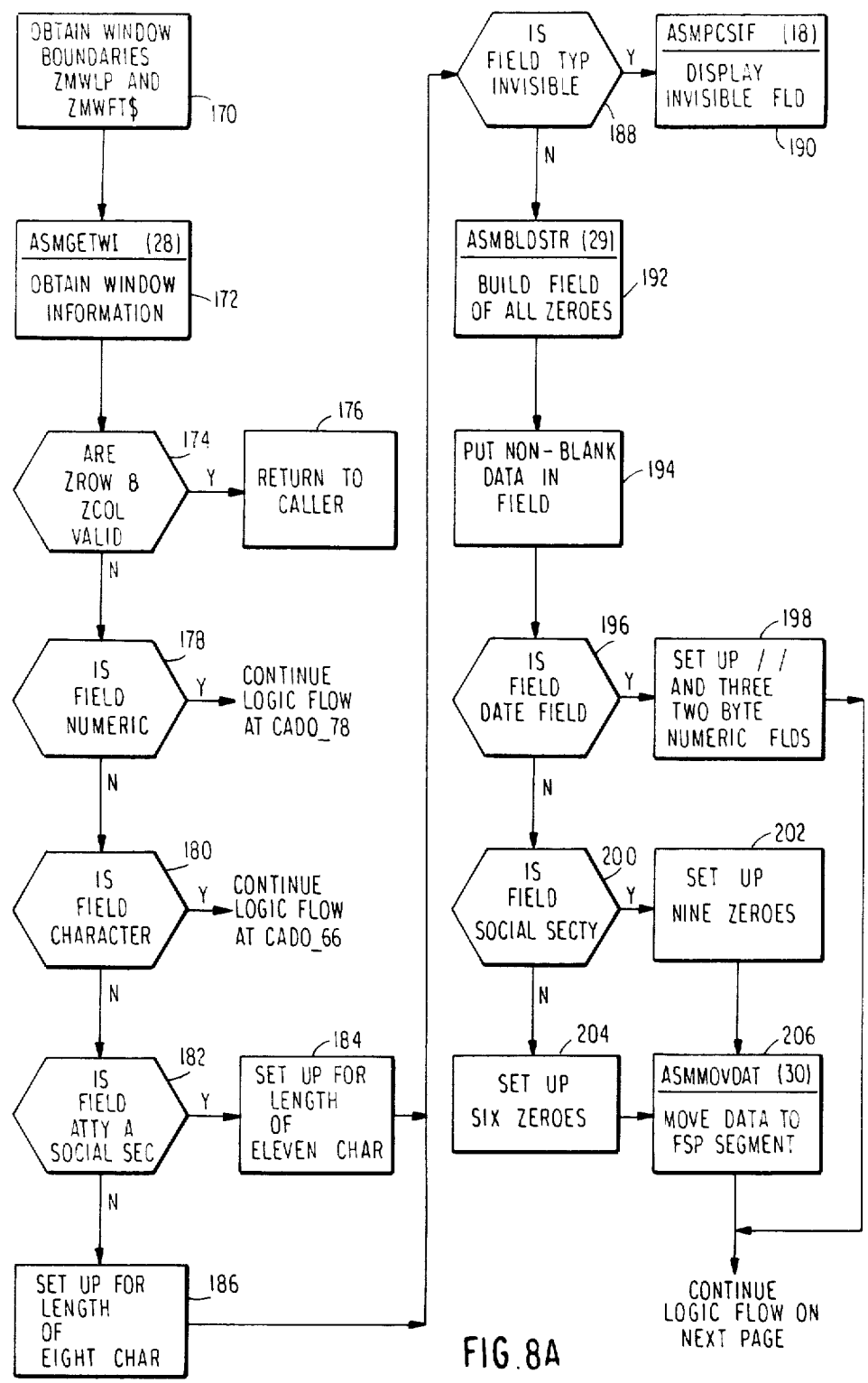
FIGS. 8A and 8B, taken together, are a flow chart of the display output fields module which displays all user specified output fields for a display window.
Figure 8B:
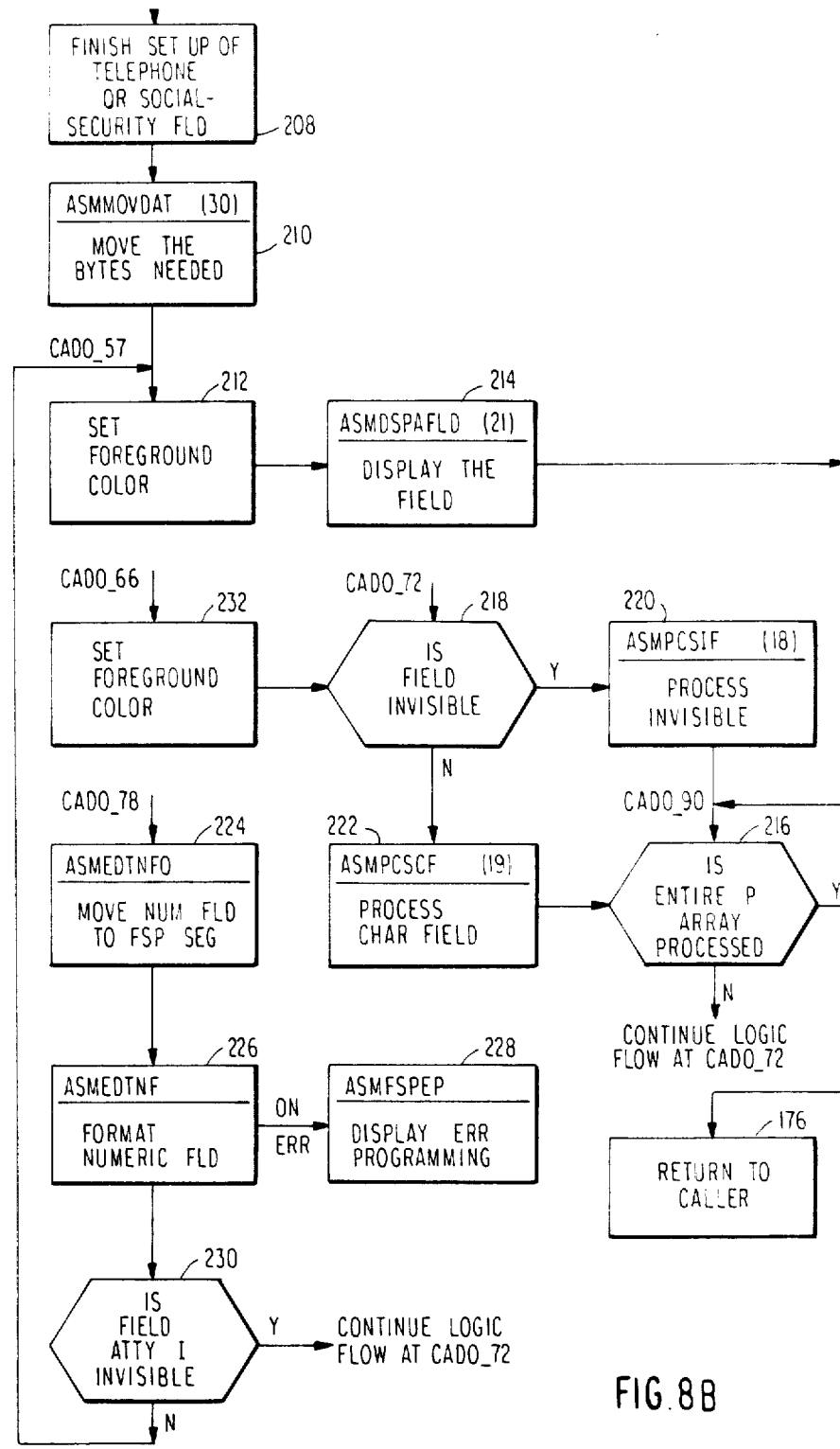
Figure 18:
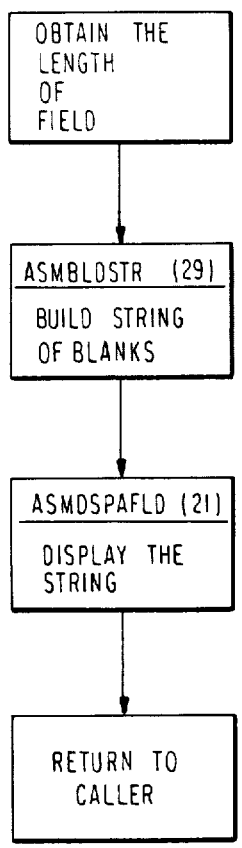
FIG. 18 is a flow chart of a module to build and display a field designated as invisible.
Figure 29:
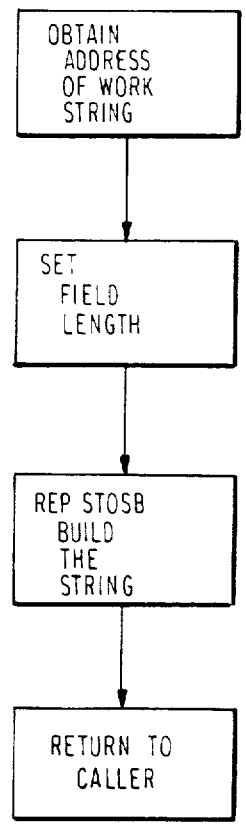
FIG. 29 is a flow chart of a module to build a string in the full screen processor data segment that is composed of a user specified character and size.
Figure 30:
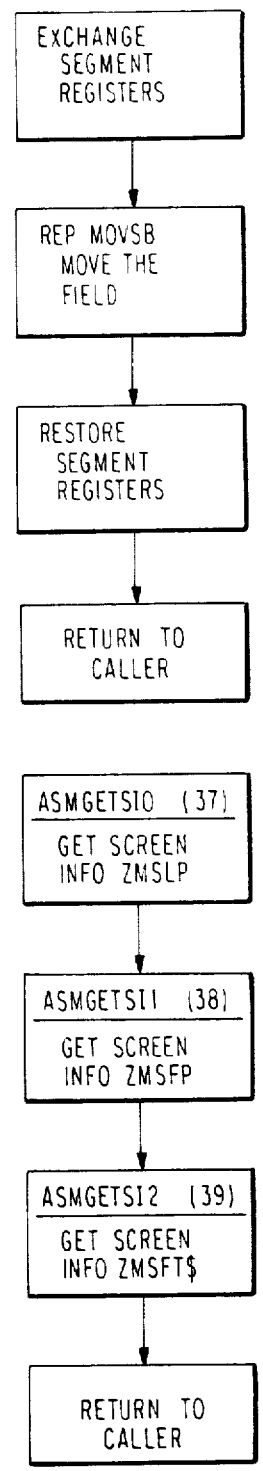
FIG. 30 is a flow chart of a module to move data strings from the Business BASIC data segment to the full screen processor data segment.

The sixth module to which the router routine shown in FIG. 2 may branch is the ASMDSPSOUT module which displays all "user specified" output fields for a display window. This module is shown in FIGS. 8A and 8B, and the first step shown in FIG. 8A is to obtain the addresses and window boundaries for the "window" arrays, ZMWLP and ZMWFT$, and the window number to display as indicated by block 170. Then in block 172 a call is made to the module ASMGETWI, shown in FIG. 28, to obtain the information for the desired field within the window. A check is made in block 174 to determine if the ZROW and ZCOL are valid. If they are not, the module returns to the caller in block 176; otherwise, a series of tests are made to determine the type of field that is to be displayed. The first test, made in block 178, is to determine if the field is a numeric field. If it is, the process continues on FIG. 8B, but if not, a test is made in block 180 to determine if the field is a character field. If it is, the process continues on FIG. 8B, but if not, a test is made in block 182 to determine if the field is a social security field. If it is, the field length is set to eleven characters in block 184; otherwise, the field length is set to eight characters in block 186. Then a test is made in block 188 to determine if the field type is invisible and, if so, the ASMPCSIF module shown in FIG. 18 is called in block 190 to display an invisible field, and processing continues on FIG. 8B. If the test in block 188 is negative, a field of all zeros is built in block 192 by calling module ASMBLDSTR shown in FIG. 29, and then non-blank data is put in the field in block 194. The field is tested in block 196 to determine if it is a date field. If it is, set up is made in block 198 to format the field with slashes "/" and to copy three two-byte numeric fields, and processing continues on FIG. 8B. If not a date field, then a test is made in block 200 to determine if the field is a social security field. If so, nine zeroes are set up in block 202; otherwise, six zeroes are set up in block 204. In either case, the process goes to block 206 which calls the module ASMMOVDAT shown in FIG. 30 to move data to the full screen processor segment, and processing continues on FIG. 8B.

The next step in the process shown in FIG. 8B is to finish the set up of a telephone or social security field, as indicated by block 208. Then the ASMMOVDAT module shown in FIG. 30 is called again in block 210 to move the bytes needed for the field. The foreground color is set in block 212, and then the field is displayed in block 214 by calling the module ASMDSPAFLD shown in FIG. 21. At this point, a test is made in block 216 to determine if the entire array has been processed, and if it has, a return to the caller is made in block 176. Otherwise, the logic flow goes to block 218 where a test is made to determine if the field is invisible. If so, the invisible field is processed in block 220 by calling module ASMPCSIF shown in FIG. 18. If not, the character field is processes in block 222 by calling module ASMPCSCF shown in FIG. 19. In either case, the test to determine if the entire array has been processed in block 216 is next made.

Returning briefly to FIG. 8A, if the test in block 178 is positive, then the process goes to block 224 in FIG. 8B. In this block, the numeric field is moved to the full screen processor segment by calling a module ASMEDTNFO which makes the setup for an edit/format numeric field call (ASMEDTNF) for output fields. This includes moving the field whose address and length are in ZFLDA$ and ZFLDL$ to the full screen processor data segment Then, in block 226, the numeric field is formatted by calling the module ASMEDTNF which determines if a character string contains a valid numeric value and then returns a character string that contains the numeric value in a specified format. If there is not a valid numeric value, the module ASMFSPEP is called in block 228 to display an error message for the programmer in order to facilitate a quicker debugging. On the other hand, if there is a valid numeric value, a test is made in block 230 to determine if the field attribute is set to invisible. If so, the process goes to block 218; otherwise, it goes to block 212.

Again briefly returning to FIG. 8A, if the test at block 180 is positive, the process goes to block 232 in FIG. 8B. In block 232, the foreground color is set, and then a test is made in block 218 to determine if the field is invisible.

Figure 9:
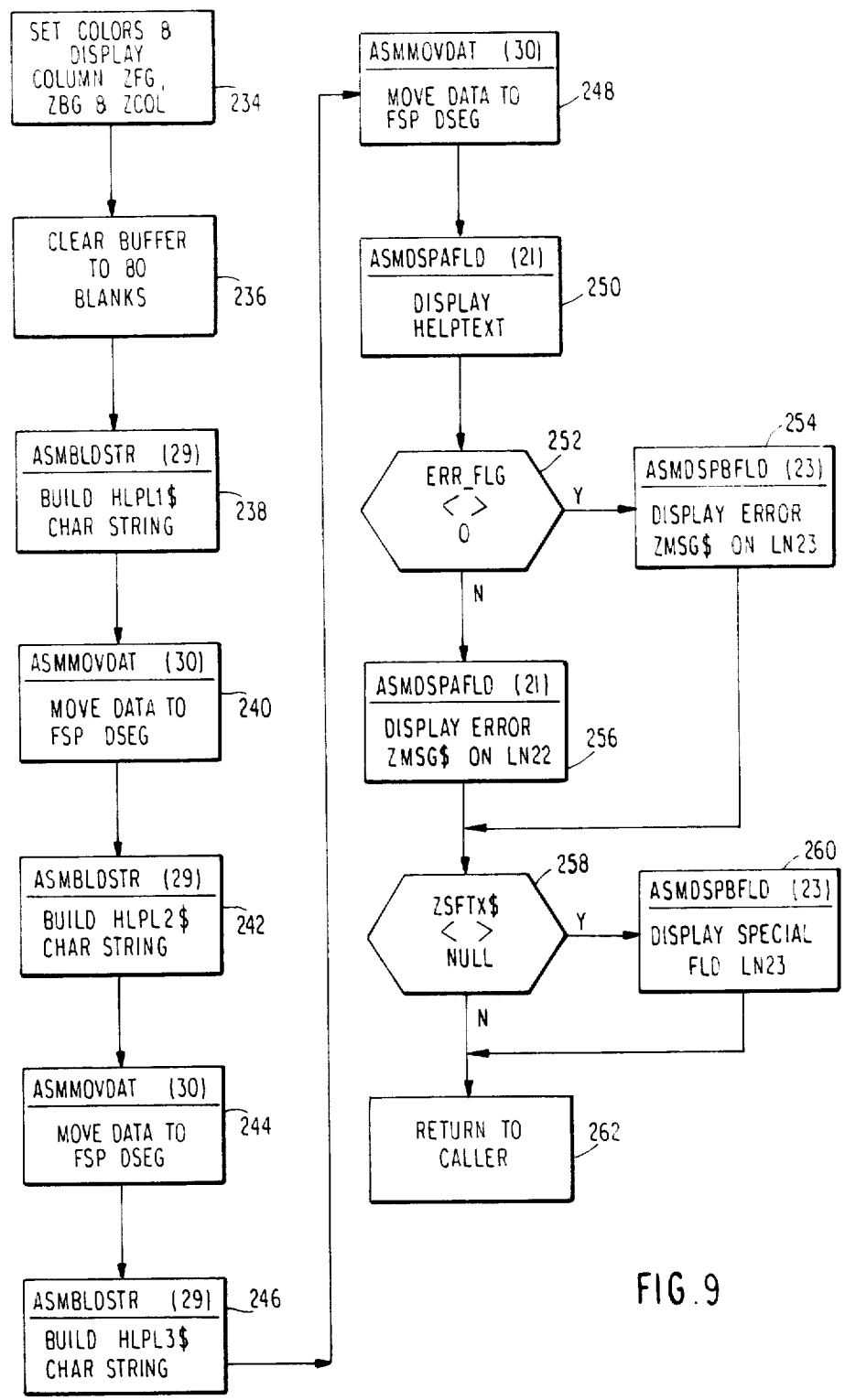
FIG. 9 is a flow chart of the display help text module which displays the help text on the screen.

The seventh module to which a branch can be made from the router routine of FIG. 2 is the display help text module shown in FIG. 9. This module displays the help text on the screen and begins by setting the correct colors and display column for the help text to be displayed in block 234. The buffer is cleared to 80 blanks in block 236, and then a series of build character strings and move data steps are made to generate the help text. The first line of the help text is built in block 238 by calling the module ASMBLDSTR shown in FIG. 29, and when completed, the data is moved to the full screen processor data segment by calling the module ASMMOVDAT shown in FIG. 30. This process is repeated in blocks 242 and 244 for the second line of the help text and in blocks 246 and 248 for the third line of the help text. When the three lines of the help text have been built and moved into the full screen processor data segment, the help text is displayed in block 250 by calling the module ASMDSPAFLD shown in FIG. 21. In block 252, a test is made to determine if an error flag has been set, and if so, the error message is displayed on line 23 by calling module ASMDSPBFLD shown in FIG. 23 as indicated by block 254. If the test in block 252 is negative, the error message is displayed on line 22 by calling the module ASMDSPAFLD shown in FIG. 21 as indicated by block 256. In either case, the process goes to block 258 where a test is made to determine if ZSFTX$ is a null. If so, a special field is displayed on line 23 by calling module ASMDSPBFLD as indicated by block 260 and then a return to the caller is made in block 262; otherwise, a return to the caller is made directly from block 258.

Figure 10:
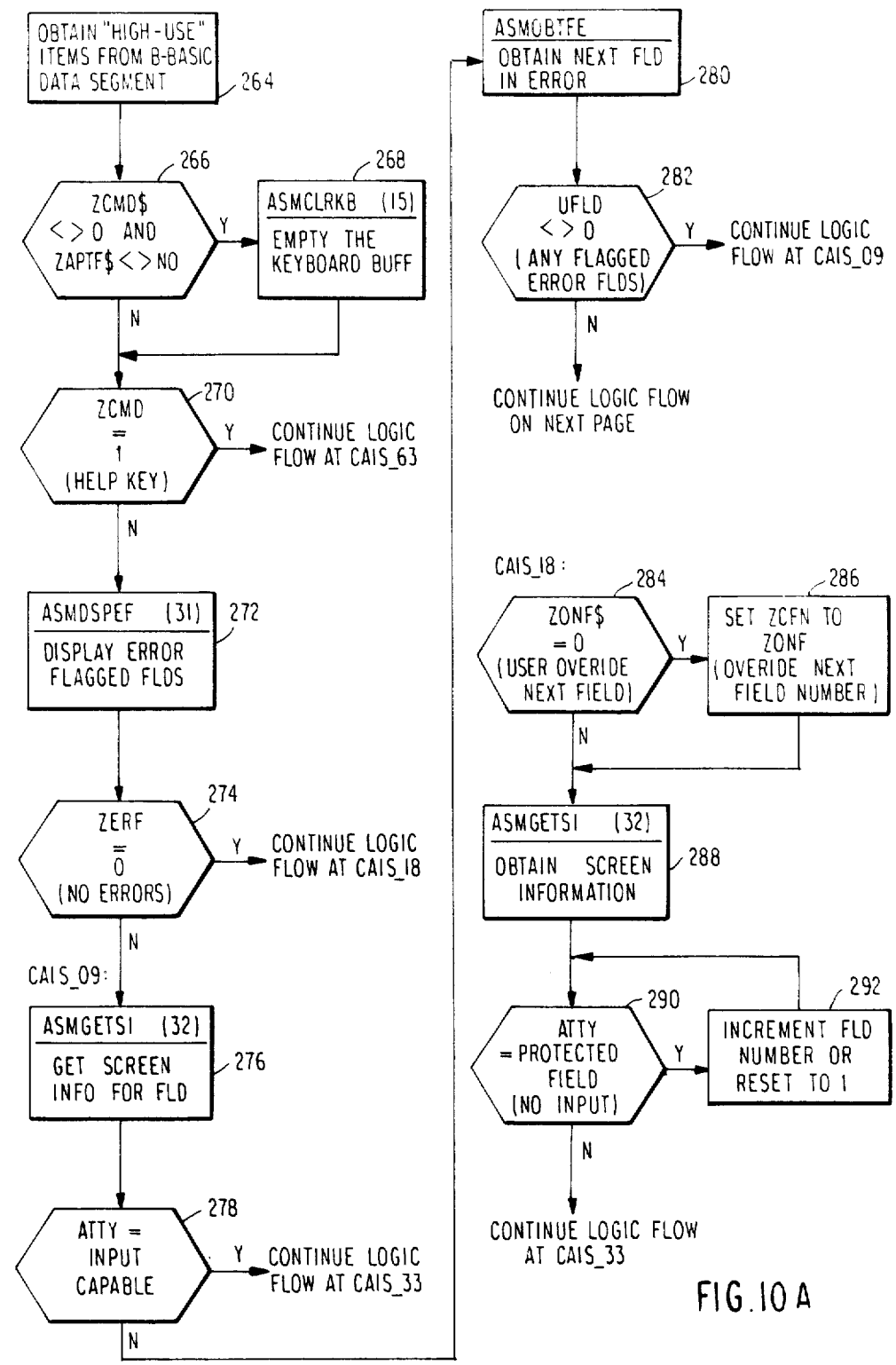
FIGS. 10A and 10B, taken together, are a flow chart of the input screen module which is called by Business BASIC to obtain an input field from the end user.
Figure 10B:
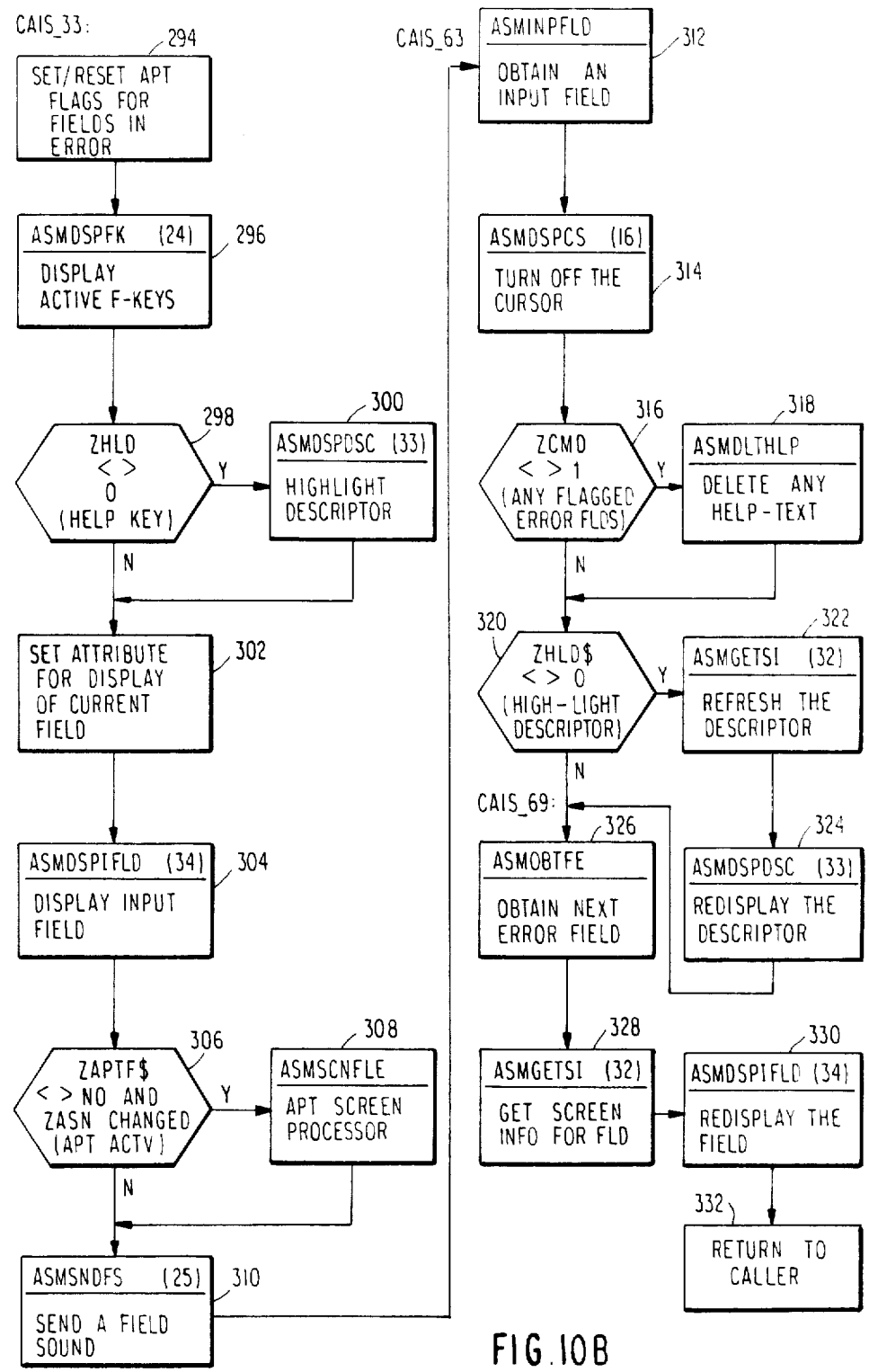
Figure 31:
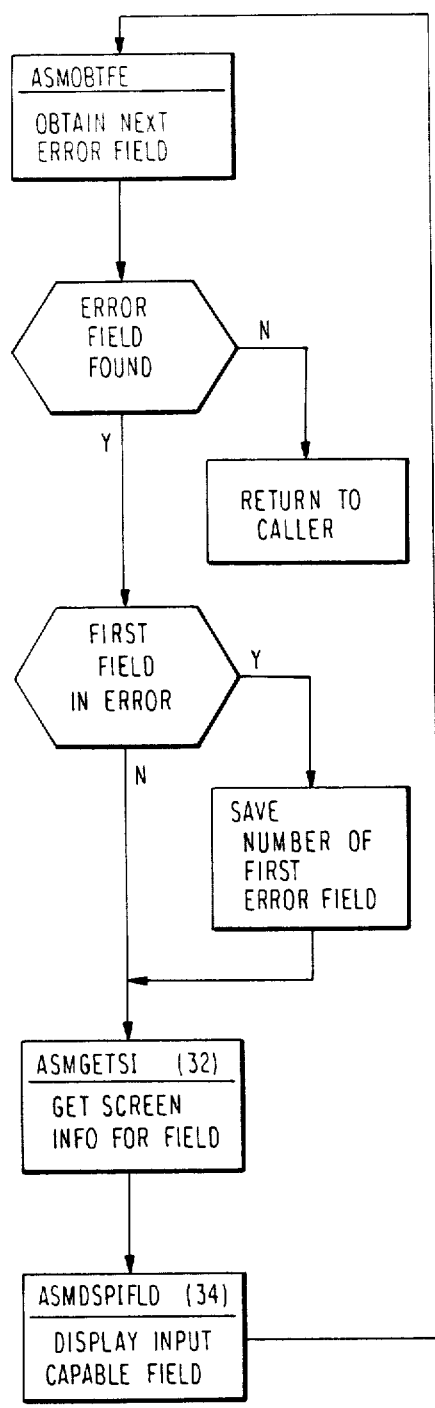
FIG. 31 is a flow chart of a module to display the input fields flagged in error.
Figure 32:
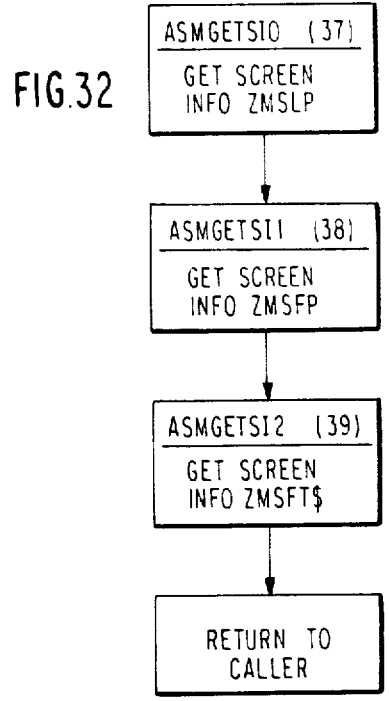
FIG. 32 is a flow chart of a module to obtain the information for an output capable field from the full screen processor arrays within the Business BASIC data segment.

The eighth module to which a branch can be made from the router routine shown in FIG. 2 is the input screen module which obtains an input field from the user. This module is shown in FIGS. 10A and 10B. The first step in block 264 is to obtain the "high use items" from the Business BASIC segment. These include ZCMD, the last function key used, ZCFN, the current field number, ZONF, the override field number, ZFDS, the maximum number of input fields for the screen, ZDATA$, the address of the "field" in Business BASIC where the current input field will be returned, ZHLD, the flag used to determine if the descriptor field needs to be highlighted for the current input field, ZSS, the current screen number, and ZERR, the address of the "fields detected in error" array within Business BASIC. A check is made in block 266 to determine if a function key was used for the last "exit", and if so, the keyboard buffer is emptied in block 268 by calling module ASMCLRKB shown in FIG. 15. In any case, a test is then made in block 270 to determine if this is a return from a display of help text for an input field, and if not, a branch is made to FIG. 10B; otherwise, the process continues to gather input. In block 272, the error flagged fields are displayed by calling module ASMDSPEF shown in FIG. 31. Then in block 274, a check is made to determine if there are any more error fields, and if not, the screen information for the field is obtained in block 276 by calling module ASMGETSI shown in FIG. 32. The attribute for this data is tested in block 278 to determine if it is input capable, and if not, the next field in error is obtained in block 280; otherwise, the process goes directly to FIG. 10B. Proceeding from block 280, a test is made in block 282 to determine if there are any flagged error fields. If so, the process goes back to block 276; otherwise, the process goes to FIG. 10B. Returning to block 274, if the test there is positive, a test is made in block 284 for a user override to go to the next field. If there is a user override, ZCFN is set to ZONF in block 286 in order to override the next field number. In either case, screen information is obtained in block 288 by calling module ASMGETSI shown in FIG. 32. An attribute is checked in block 290 to determine if this is a protected field which will not accept a user input. If it is, the field number is incremented or reset to one in block 292, and the test of block 290 is repeated. At this point, the process goes to FIG. 10B to which reference is now made.

Block 294 may be entered from blocks 270, 278, 282, or 290 on FIG. 10A. In this block, the flag values for APT are set or reset depending on any fields having been in error. The function keys are redisplayed in block 296 by calling module ASMDSPFK shown in FIG. 24. A test is then made in block 298 to determine if the input field descriptor is to be highlighted, and if it is, it is redisplayed in highlight by calling module ASMDSPDSC shown in FIG. 33, as indicated in block 300. In block 302, the correct display attributes are set for display of the current input field which is then displayed in block 304 by calling module ASMDSPIFLD shown in FIG. 34. A test is made in block 306 to determine if APT is to be called to capture the screen. If it is, the APT screen processor is entered in block 308; otherwise, the process goes directly to block 310. The ZCMD and ZKEY fields which will be returned upon exit from this routine are reset, a field sound is made by calling the module ASMSNDFS shown in FIG. 25, and the help text number for the current input field is returned. A call is next made in block 312 to allow input into the current input field. This is accomplished by the ASMINPFLD module which processes a single input field by interfacing the keyboard input with the display output. Next, a call is made in block 314 to remove the cursor by calling module ASMDSPCS shown in FIG. 16. A test is then made in block 316 for any flagged error fields. If the test is positive, any displayed help text is erased, the current field is reset if it is flagged in error, and the descriptor text is redisplayed without highlighting if it is currently highlighted as indicated in blocks 318, 320, 322, and 324. At this point, any fields displayed as error fields are redisplayed using normal display attributes as indicated in blocks 326, 328 and 330. A return to the caller is then made in block 332.

Figures 11, 12:
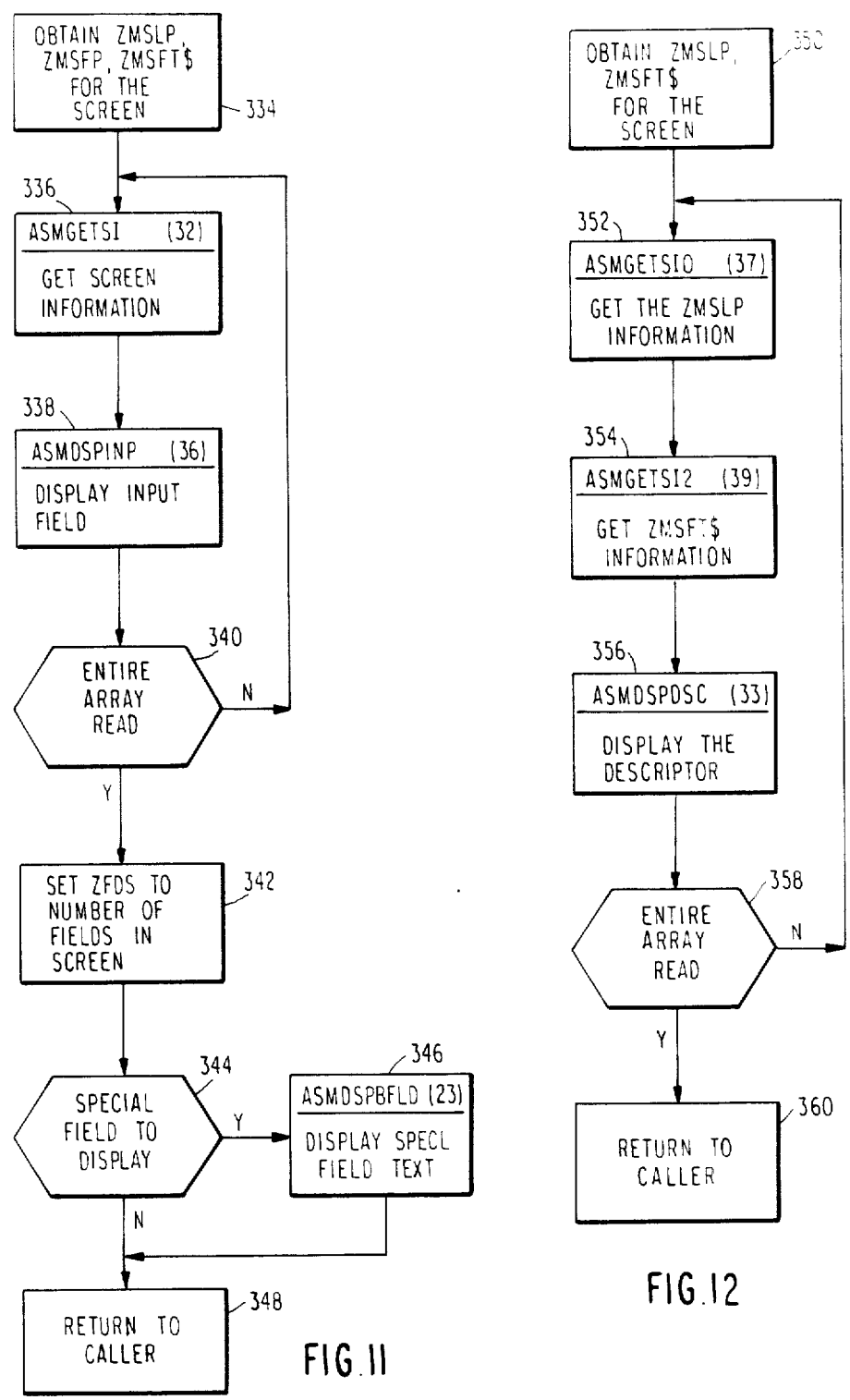
FIG. 11 is a flow chart of the display input capable fields module which displays all input capable fields, for a screen.
FIG. 12 is a flow chart of the display field descriptors module which displays all input field descriptors for a screen.

The ninth module to which a branch can be made from the router routine shown in FIG. 2 is the display input capable fields module shown in FIG. 11. The function of this module is to display all input capable fields for a screen. The first step in this process is to obtain the addresses and window boundaries for the "screen" arrays ZMSLP, ZMSFP, and ZMSFT$ and the screen number for the display, as indicated in block 334. A call is then made in block 336 to module ASMGETSI shown in FIG. 32 to obtain the information for the desired input field within the screen. Next, a call is made in block 338 to module ASMDSPINP shown in FIG. 36 to display the input capable field and setup to check the next field. A check is made in block 340 to determine if the entire array has been read, if it has not, the process loops back to block 336 to get additional screen information. When the entire array has been read, the field count is decremented to negate the last increment and set as the value for ZFDS in the BASIC data segment, as indicated in block 342. The field is tested in block 344 to determine if a special field text needs to be displayed at the bottom of the screen. If so, the special field text is displayed in block 346 by calling module ASMDSPBFLD shown in FIG. 23. Thereafter, a return is made to the caller in block 348.

Figures 35, 37:
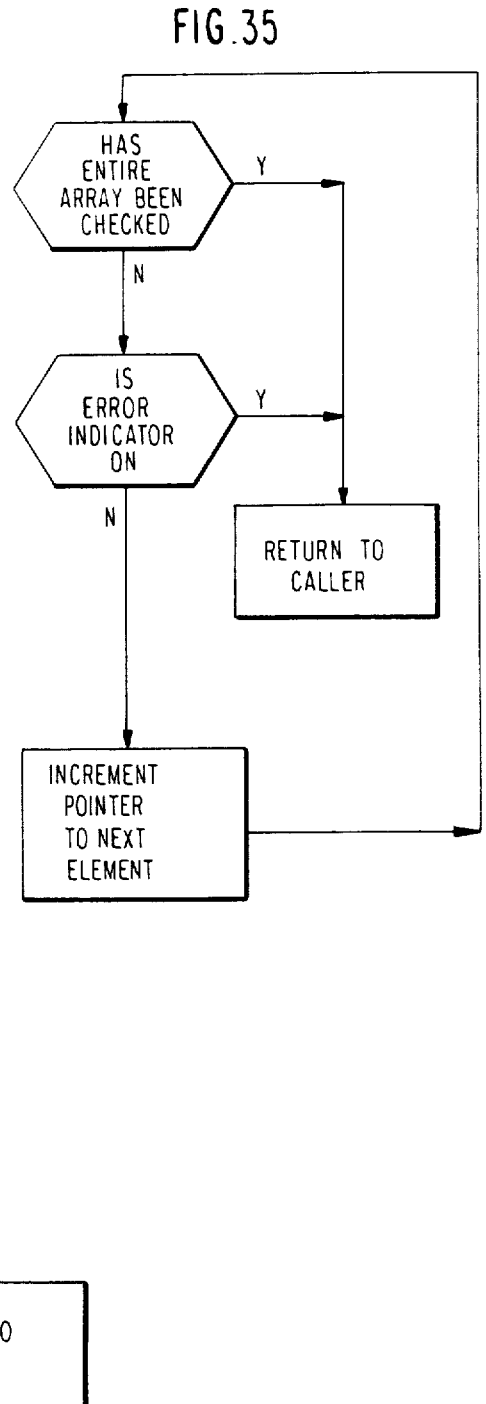
FIG. 35 is a flow chart of a module to search the error array and look for the next field that is flagged in error.
FIG. 37 is a flow chart of a module to obtain the screen information from the ZMSLP array which resides in, the Business BASIC data segment.
Figure 39:
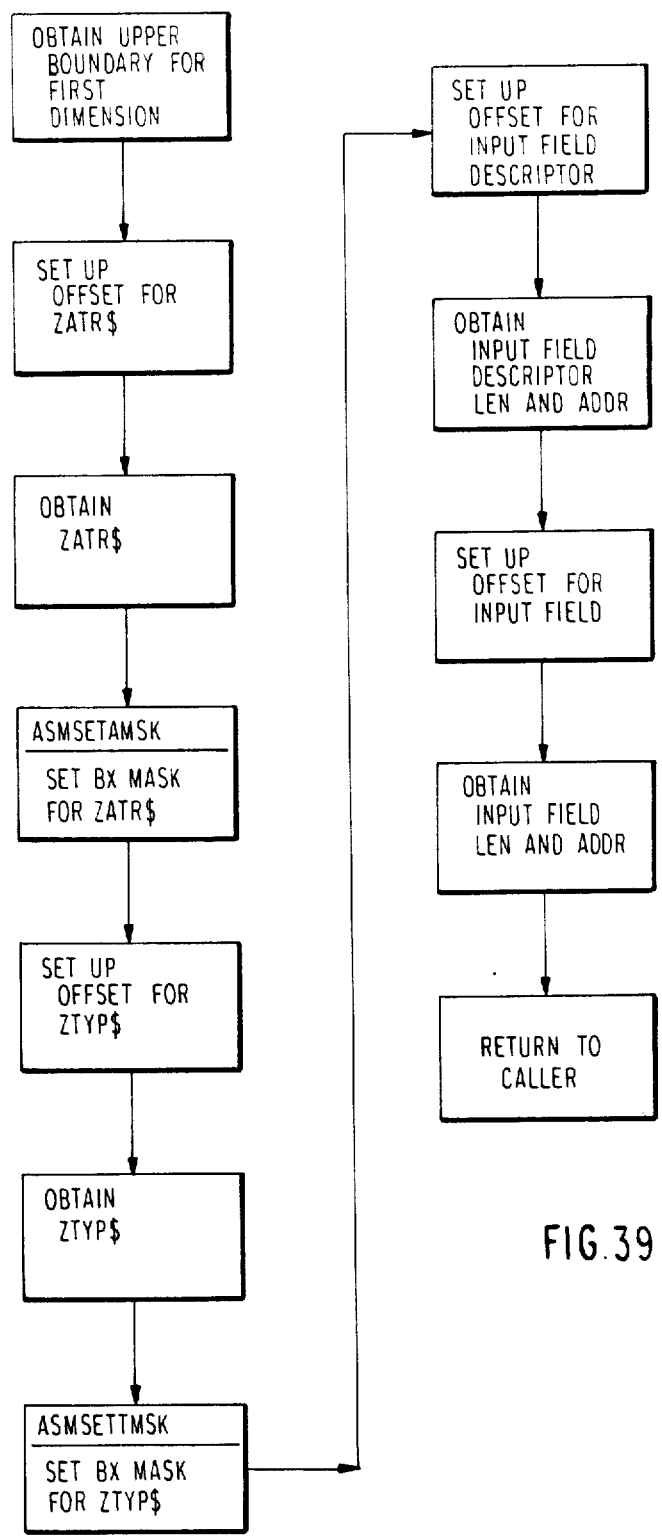
FIG. 39 is a flow chart of a module to obtain screen information from the ZMSFT$ array which resides in the Business BASIC data segment.
Figure 40:
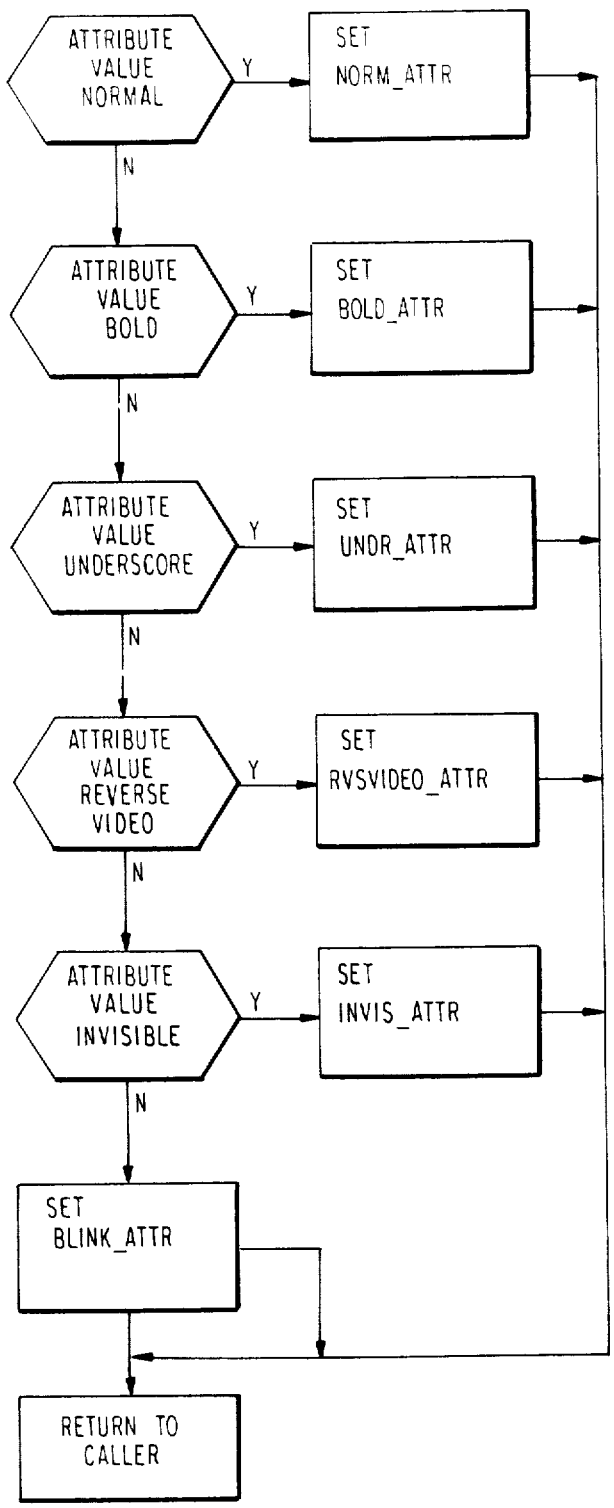
FIG. 40 is a flow chart of a module to convert a color element, which is one byte, from a string value to a BIOS binary value.
Figure 44:
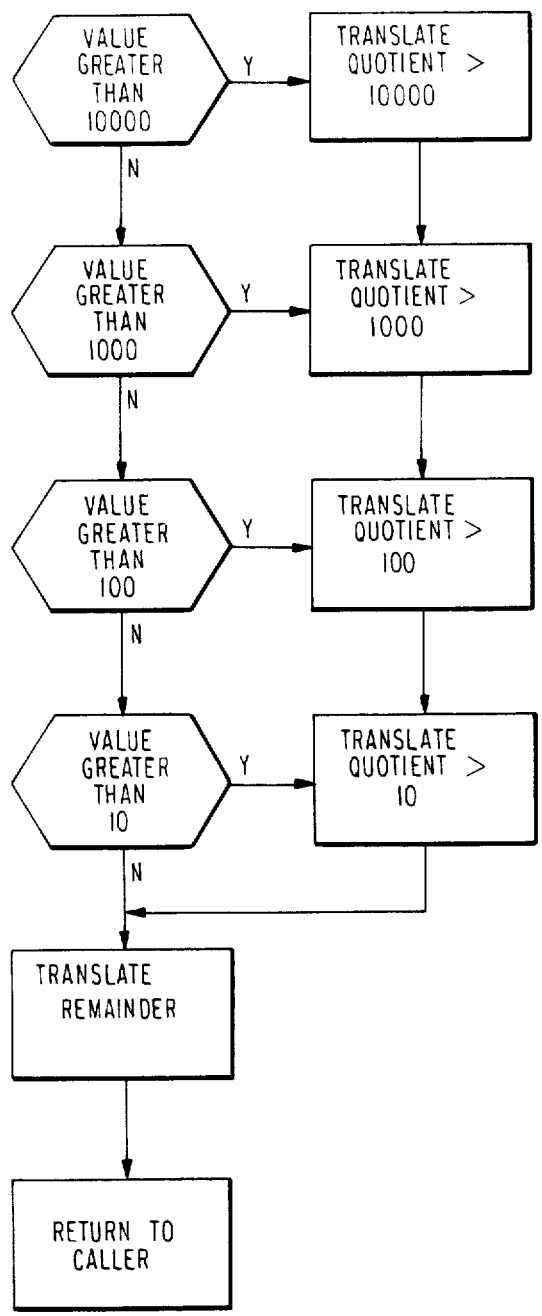
FIG. 44 is a flow chart of a module to convert a binary number to an ASCII string with the same "value"
Figure 43:
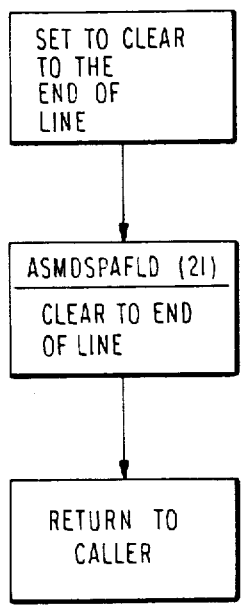
FIG. 43 is a flow chart of a module to clear the function key line from the end of the last function key displayed to the end of the line.

The tenth module to which a branch can be made from the router routine shown in FIG. 2 is the display field descriptions module shown in FIG. 12. The function of this module is to display all input field descriptors for a screen. The first step in this process, as indicated by block 350, is to obtain the addresses and window boundaries for the "screen" arrays ZMSLP and ZMSFT$ and the screen number for the display. Then a call is made in block 352 to the module ASMGETSI0 shown in FIG. 37 to obtain the ZMSLP information. This is followed by a call in block 354 to the module ASMGETSI2 shown in FIG. 39 to get the ZMSFT$ information. Then, a call is made in block 356 to the module ASMDSPDSC shown in FIG. 33 to display the descriptor, and a check is made in block 358 to determine if the entire array has been read. If not, the process loops back to block 352 to obtain more information; otherwise, the process returns to the caller in block 360.

Figure 13:
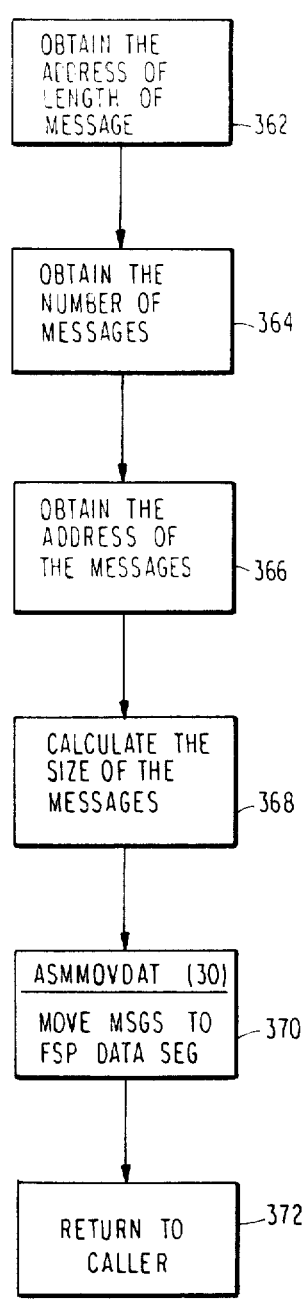
FIG. 13 is a flow chart of the obtain full screen processor error messages module which moves all of the full screen processor resident error messages into the full screen processor data segment.

The eleventh and last module to which a branch can be made in the router routine shown in FIG. 2 is the module to obtain error messages shown in FIG. 13. The function of this module is to move all the full screen processor error messages into the full screen processor data segment. The first step in this process is to obtain the address of the length of the message in block 362. Then, in blocks 364 and 366 the number of the messages and the address of the messages are obtained, respectively. The size of the messages is calculated in block 368. A call is made in block 370 to the module ASMMOVDAT shown in FIG. 30 to move the messages to the full screen processor data segment, and then a return is made to the caller.

This completes the description of the principle modules of the preferred embodiment of the full screen processor. As indicated in the description of these modules, calls are made to one or more modules which are shown in FIGS. 14 to 44. Based on the description already presented, these modules are self-explanatory and, therefore, a detailed description thereof is omitted.

The full screen processor support routines are easy to use and yet provide the application programmer extreme flexibility in performing screen management functions. By providing this interface between the application programmer and the personal computer, a number of significant benefits are achieved. These include consistent screen handling, a reduction in the learning curve for screen-handling functions, a reduction in overall program development time, and the ability of the application programmer to concentrate on the application portion of his program. Another important benefit derived from using the full screen processor support routines is that in the event system architecture standards are changed, these changes can be incorporated into the full screen processor routines, and the new full screen processor modules can be merged into the affected application programs. This significantly reduces the maintenance time required to update application programs in the area of screen functions and reduces possible coding errors during such maintenance. Also, by allowing the programmer to think in terms of main screen functions such as display of headings and field descriptors, display of data fields and reading input, it becomes easier to migrate application programs to other microcomputer systems by merely rewriting the full screen processor support routines to reflect the new hardware and software.

Attached as an appendix is the application portion of a typical program using the full screen processor support routines. This program displays two screens, a data entry screen shown in FIG. 45 and a status screen shown in FIG. 46. The program does editing on input fields, displaying appropriate error messages, and displays help text as well as function key descriptors.

Those skilled in the art will appreciate that while the invention has been described with respect to a specific preferred embodiment thereof, changes may be made therein without departing from the spirit and scope of the invention.

APPENDIX

```
3560  ' **** Screen specifications
3570  '
3580  ' Row , Data-field , Data-field , Field-type , Descriptor , "Descriptor"
3590  '         column      length                     column
3600  '
3610  DATA 01,02,08,p,00,""
3620  DATA 01,00,00,0,31,"Inventory Accounting"
3630  DATA 01,00,00,0,60,"Add"
```

```
3640 DATA 01,00,00,0,75,"3321b"
3650 DATA 02,00,00,0,02,"Data"
3660 DATA 02,00,00,0,35,"Transactions"
3670 DATA 05,18,04,p,02,"Last line no."
3680 DATA 06,18,15,P,02,"Last item no."
3690 DATA 09,18,04,p,02,"Line no."
3700 DATA 10,18,15,C,02,"Item no."
3710 DATA 11,18,25,P,02,"Description"
3720 DATA 12,18,09,N,02,"Trans quantity"
3730 DATA 13,18,03,C,02,"U/M"
3740 DATA 14,18,11,N,02,"Trans amount"
3750 DATA 15,18,01,C,02,"Trans type"
3760 DATA 15,00,00,0,20,"(A,C,I,O,R,S,Y)"
3770 DATA 16,18,01,n,02,"Warehouse no."
3780 DATA 16,00,00,0,20,"(1,2,3)
3790 DATA 17,18,06,n,02,"Trans date"
3800 DATA 18,18,06,c,02,"Reference"
3810 DATA 09,00,00,0,52,"A-Adjustment"
3820 DATA 10,00,00,0,52,"C-Cost Adjustment"
3830 DATA 11,00,00,0,52,"I-Issue"
3840 DATA 12,00,00,0,52,"O-Order"
3850 DATA 13,00,00,0,52,"R-Receipt"
3860 DATA 14,00,00,0,52,"S-Sale"
3870 DATA 15,00,00,0,52,"Y-Recount"
3880 DATA 99,00,00,0,00,""

3890 '
3900 '
3910 DATA 01,02,08,P,00,""
3920 DATA 01,00,00,0,31,"Inventory Accounting"
3930 DATA 01,00,00,0,75,"3321c"
3940 DATA 02,00,00,0,02,"Status"
3950 DATA 02,00,00,0,37,"Invoices"
3960 DATA 05,16,03,p,02,"Batch number"
3970 DATA 05,37,03,p,22,"Session number"
3980 DATA 05,00,00,0,50,"Session"
3990 DATA 05,00,00,0,73,"Batch"
4000 DATA 06,00,00,0,50,"totals"
4010 DATA 06,00,00,0,73,"totals"
4020 DATA 07,47,10,p,02,"Number of invoices"
4030 DATA 08,47,10,p,02,"Total invoice amount"
4040 DATA 09,47,10,p,02,"Total cash discount allowable amount"
4050 DATA 07,69,10,p,00,""
4060 DATA 08,69,10,p,00,""
4070 DATA 09,69,10,p,00,""
4080 DATA 10,69,10,p,02,"Number of lines available"
4090 DATA 23,02,01,i,00,""
4100 DATA 99,00,00,0,00,""

4110 '
4120 '
4130 ' **** Mainline
4140 GOSUB 150                              ' Dimension FSP arrays
4150 GOSUB 5270                             ' Program Initialization 4160 '
4170 ' Display screen 1  (Data screen)
4180 RESTORE: SCRN=1: GOSUB 310             ' Read screen specifications
4190 GOSUB 4550                             ' Get default values
4200 GOSUB 5680                             ' Initialize F-key array
4210 CLS: GOSUB 400                         ' Display field-descriptorss
4220 GOSUB 1050                             ' Display F-key descriptions
4230 GOSUB 510                              ' Display data-fields
4240 GOSUB 1370                             ' Read input
4250 IF ZCMD=9 THEN GOTO 4500               ' F9 - Sign off
4260 IF ZCMD=8 THEN GOSUB 4550              ' F8 - Reset default values
4270 IF ZCMD=8 THEN ZNEXT=1: GOTO 4230      ' Redisplay data-fields
4280 GOSUB 4880                             ' Edit
4290 IF ZCMD=1 THEN GOSUB 5190              ' F1 - Get help-text
```

```
4300 IF ZCMD=1 THEN GOSUB 1220: GOTO 4240    ' Display help-text
4310 IF ZRMSG>0 THEN GOTO 4240               ' Error
4320 IF ZCMD=2 THEN GOTO 4360                ' F2 - Status screen
4330 IF Z=10 THEN GOTO 4230                  ' Display new item description
4340 GOTO 4240                               ' Read next field 4350 '
4360 ' Display screen 2  (Status screen)
4370 SCRN=2: GOSUB 310                       ' Read screen specifications
4380 GOSUB 4550                              ' Get default values
4390 GOSUB 5680                              ' Initialize F-key array
4400 CLS: GOSUB 400                          ' Display field-descriptors
4410 GOSUB 1050                              ' Display F-key descriptions
4420 GOSUB 510                               ' Display data-fields
4430 GOSUB 1370                              ' Read input
4440 IF ZCMD=9 THEN GOTO 4500                ' F9 - Sign off
4450 GOSUB 4880                              ' Edit
4460 IF ZRMSG>0 THEN GOTO 4430               ' Error
4470 IF ZCMD=2 THEN GOTO 4170                ' F2 - Data screen
4480 GOTO 4430                               ' Read next field 4490 '
4500 GOSUB 5840                              ' Program Termination
4510 IF EOJ=0 THEN GOTO 4170                 ' Start over
4520 GOTO 6470                               ' E-O-J 4530 '
4540 '
4550 ' **** Assign default values
4560 FOR X=1 TO ZFLDS: ZDATA$(X)="": NEXT X  ' Initialize data-fields
4570 ON SCRN GOTO 4590,4740

4580 '
4590 ZDATA$(1)=UDATE$
4600 ZDATA$(7)="1"
4610 ZDATA$(8)="A12345"
4620 ZDATA$(9)="2"
4630 ZDATA$(10)="B55555"
4640 ZDATA$(11)="Item Desc #"+ZDATA$(10)
4650 ZDATA$(12)="100"
4660 ZDATA$(13)="EA"
4670 ZDATA$(14)="1200.00"
4680 ZDATA$(15)="R"
4690 ZDATA$(17)="1"
4700 ZDATA$(19)="21683"
4710 ZDATA$(20)="P01234"
4720 GOTO 4850

4730 '
4740 ZDATA$(1)=UDATE$
4750 ZDATA$(6)="1"
4760 ZDATA$(7)="2"
4770 ZDATA$(12)="20"
4780 ZDATA$(13)="1,310.50"
4790 ZDATA$(14)="13.10"
4800 ZDATA$(15)="57"
4810 ZDATA$(16)="5,678.92"
4820 ZDATA$(17)="56.78"
4830 ZDATA$(18)="443"

4840 '
4850 RETURN

4860 '
4870 '
4880 ' **** Edit data-fields   (edit last data-field first)
4890 ON SCRN GOTO 4910,5110

4900 '
4910 ' Edit screen 1
```

```
4920 ' Trans date
4930 IF ZDATA$(19)=SPACE$(6) THEN ZERR(19)=1: ZRMSG=1030

4940 ' Warehouse
4950 IF INSTR("123",ZDATA$(17))=0 THEN ZERR(17)=1: ZRMSG=1020

4960 ' Transaction type
4970 IF INSTR("ACIORSY",ZDATA$(15))=0 THEN ZERR(15)=1: ZRMSG=1010

4980 ' Trans amount
4990 IF ZDATA$(14)=SPACE$(11) THEN ZERR(14)=1: ZRMSG=1030

5000 ' U/M
5010 IF ZDATA$(13)=SPACE$(3) THEN ZERR(13)=1: ZRMSG=1030

5020 ' Trans Quantity
5030 IF ZDATA$(12)=SPACE$(9) THEN ZERR(12)=1: ZRMSG=1030

5040 ' Item number
5050 IF ZDATA$(10)=SPACE$(15) THEN ZERR(10)=1: ZRMSG=1030
5060 IF ZERR(10)=0 THEN ZDATA$(11)="Item Desc #"+ZDATA$(10)

5070 ' F-keys
5080 IF INSTR("01289",ZCMD$)=0 THEN ZRMSG=1000
5090 GOTO 5160

5100 '
5110 ' Edit screen 2
5120 ' F-keys
5130 IF INSTR("029",ZCMD$)=0 THEN ZRMSG=1000

5140 '
5150 '
5160 RETURN

5170 '
5180 '
5190 ' **** Get help-text
5200 ZHELP$(1)=
        "Help text for '"+ZDSC$(Z)+"'. The information required for this
        field is"
5210 ZHELP$(2)=
        "gobbldygook and is used for fghrtyzvver, and also to calculate the"
5220 ZHELP$(3)=
        "fraknspkn. For further information, please see your User's Guide,
        page"+STR$(Z)+"."
5230 FOR X=1 TO 3: IF LEN(ZHELP$(X))<80
        THEN ZHELP$(X)=ZHELP$(X)+SPACE$(80-LEN(ZHELP$(X))): NEXT X
5240 RETURN 5250 '
5260 '
5270 ' **** Initialize
5280 SCREEN 0,0,0      ' Initialize screen
5290 ZHLD=1      ' High-light field descriptors
5300 ZMSGN=5     ' Number of messages in ZMSG$
5310 CLS: KEY OFF: FOR X=1 TO 10: KEY X,"": NEXT X
5540 GOSUB 5590     ' Initialize message array
5550 UDATE$=MID$(DATE$,1,2)+"/"+MID$(DATE$,4,2)+"/"+MID$(DATE$,9,2)
5560 RETURN 5570 '
5580 '
5590 ' **** Initialize message array
5600 ZMSG$(1)="A1000 * That command key is not available"
5610 ZMSG$(2)="A1010 * Invalid code - must be A,C,I,O,R,S,Y"
5620 ZMSG$(3)="A1020 * Invalid code - must be 1,2,3"
5630 ZMSG$(4)="A1030 * You must enter something here"
5640 ZMSG$(5)="A1040 * That option is not available yet"
5650 RETURN
```

```
5660 '
5670 '
5680 ' **** Initialize F-key array
5690 FOR X=1 TO 10: ZFKEY$(X)="": NEXT X     ' Initialize to null
5700 ON SCRN GOTO 5720,5780
5710 '
5720 ZFKEY$(1)="Help"
5730 ZFKEY$(2)="Status"
5740 ZFKEY$(8)="Reset"
5750 ZFKEY$(9)="Sign off"
5760 GOTO 5810

5770 '
5780 ZFKEY$(2)="Data"
5790 ZFKEY$(9)="Sign off"

5800 '
5810 RETURN

5820 '
5830 '
6470 END
```

Having thus described out invention, what we claim as new and desire to secure by Letters Patent is:

1. A method for generating display screens for a set of application programs which allows application programmers to write programs without having to code the specific locations on a computer display screen where information and data are to be displayed in fields of various display screens of the set of application programs comprising the steps of:

providing a series of screen management subroutines callable from an application program in the set of application programs, said subroutines including display screen headings, display field descriptors, display data fields, and read screen input;

defining a screen for at least one of said application programs by inputting from an application program screen specification data indicative of information and data to be displayed including for each field a row number, a column number, a length and a type; and managing a display screen from one of said application programs by reading said screen specification data, calling said display screen headings and display field descriptors subroutines and calling said display data fields subroutine, and calling said read screen input subroutine to read said screen specification data and display screen headings and display data fields on the display screen and, in response to user input data, to read data fields on the display screen and return the data to the application program.

2. The method for generating display screens for a set of application programs as recited in claim 1 wherein the step of defining a screen is performed by loading one or more arrays with information specifying row, column, length and type of display field by an application program using data contained in a screen driver file.

3. The method for generating display screens for a set of application programs as recited in claim 1 wherein the step of defining a screen is performed by supplying the screen specification data by means of data statements from said application program.

4. The method for generating display screens for a set of application programs as recited in claim 2 wherein the step of managing a display screen futher includes calling a subroutine to dimension said one or more arrays, said subroutine being executed once per application program and used to specify the size of said arrays, the number of elements in an array being the number of data statements defined for the largest screen to be processed by the application program plus one.

5. The method for generating display screens for a set of application programs as recited in claim 1 wherein the step of providing further includes providing additional screen management subroutines for displaying an in-process screen, displaying a history-area, displaying a status-area and displaying other constants such as help text, and the step of managing further includes the step of optionally calling one of said additional subroutines.

* * * * *